(12) United States Patent
Jang et al.

(10) Patent No.: US 12,075,955 B2
(45) Date of Patent: Sep. 3, 2024

(54) CLEANER WASHING APPARATUS

(71) Applicant: LG ELECTRONICS INC., Seoul (KR)

(72) Inventors: Jaewon Jang, Seoul (KR); Jeongseop Park, Seoul (KR); Youngkouk Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 703 days.

(21) Appl. No.: 17/144,720

(22) Filed: Jan. 8, 2021

(65) Prior Publication Data

US 2021/0228043 A1    Jul. 29, 2021

Related U.S. Application Data

(62) Division of application No. 16/333,098, filed as application No. PCT/KR2017/007549 on Jul. 14, 2017, now abandoned.

(Continued)

(51) Int. Cl.
*B08B 3/08* (2006.01)
*A47L 9/00* (2006.01)
(Continued)

(52) U.S. Cl.
CPC ............ *A47L 11/283* (2013.01); *A47L 9/009* (2013.01); *A47L 9/0606* (2013.01); *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01);
(Continued)

(58) Field of Classification Search
CPC ...................................................... A47L 13/50
See application file for complete search history.

(56) References Cited

U.S. PATENT DOCUMENTS

| 3,381,334 A | 5/1968 | Redmond |
| 3,793,665 A | 2/1974 | Thielen |

(Continued)

FOREIGN PATENT DOCUMENTS

| CN | 1568156 | 1/2005 |
| CN | 1721815 | 1/2006 |

(Continued)

OTHER PUBLICATIONS

KR101569058B1 Machine Translation (Year: 2015).*

(Continued)

*Primary Examiner* — Spencer E. Bell
(74) *Attorney, Agent, or Firm* — Birch, Stewart, Kolasch & Birch, LLP

(57) ABSTRACT

A washing apparatus washes a cleaner having a mop unit formed at a lower portion thereof. The washing apparatus includes a tray configured to form a space to receive the cleaner and washing water. A washing unit is disposed at a lower portion of the inside of the tray in contact with the mop unit. The washing unit includes a first spinning mop protrusion line configured to protrude upwardly, an upper end of the first spinning mop protrusion line being inclined downwardly in a first direction.

13 Claims, 11 Drawing Sheets

Related U.S. Application Data

(60) Provisional application No. 62/362,358, filed on Jul. 14, 2016.

(51) Int. Cl.

| | | |
|---|---|---|
| A47L 9/06 | (2006.01) | |
| A47L 9/28 | (2006.01) | |
| A47L 11/14 | (2006.01) | |
| A47L 11/16 | (2006.01) | |
| A47L 11/20 | (2006.01) | |
| A47L 11/24 | (2006.01) | |
| A47L 11/282 | (2006.01) | |
| A47L 11/283 | (2006.01) | |
| A47L 11/292 | (2006.01) | |
| A47L 11/293 | (2006.01) | |
| A47L 11/34 | (2006.01) | |
| A47L 11/40 | (2006.01) | |
| A47L 13/20 | (2006.01) | |
| A47L 13/50 | (2006.01) | |
| B08B 1/32 | (2024.01) | |
| B08B 3/04 | (2006.01) | |
| B25J 5/00 | (2006.01) | |
| B25J 9/00 | (2006.01) | |
| B25J 9/12 | (2006.01) | |
| B25J 9/16 | (2006.01) | |
| B25J 11/00 | (2006.01) | |
| G05D 1/00 | (2006.01) | |
| G05D 1/648 | (2024.01) | |
| G05D 1/65 | (2024.01) | |
| A47L 11/00 | (2006.01) | |

(52) U.S. Cl.
 CPC .......... *A47L 11/40* (2013.01); *A47L 11/4002* (2013.01); *A47L 11/4005* (2013.01); *A47L 11/4011* (2013.01); *A47L 11/4013* (2013.01); *A47L 11/4038* (2013.01); *A47L 11/4041* (2013.01); *A47L 11/405* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/408* (2013.01); *A47L 11/4083* (2013.01); *A47L 11/4088* (2013.01); *A47L 13/20* (2013.01); *A47L 13/50* (2013.01); *B08B 1/32* (2024.01); *B08B 3/041* (2013.01); *B08B 3/08* (2013.01); *B25J 5/007* (2013.01); *B25J 9/003* (2013.01); *B25J 9/126* (2013.01); *B25J 9/1664* (2013.01); *B25J 9/1666* (2013.01); *B25J 11/0085* (2013.01); *G05D 1/0223* (2013.01); *G05D 1/648* (2024.01); *G05D 1/65* (2024.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01)

(56) References Cited

U.S. PATENT DOCUMENTS

| | | | |
|---|---|---|---|
| 3,795,932 | A | 3/1974 | Young |
| 3,827,099 | A | 8/1974 | Allaire et al. |
| 4,418,342 | A | 11/1983 | Aschoff et al. |
| 5,249,325 | A | 10/1993 | Wilen |
| 5,991,951 | A | 11/1999 | Kubo et al. |
| 6,493,896 | B1 | 12/2002 | Stuchlik et al. |
| 7,320,149 | B1 | 1/2008 | Huffman et al. |
| 9,814,364 | B1 | 11/2017 | Caruso |
| 2004/0163199 | A1 | 8/2004 | Hsu |
| 2004/0221474 | A1 | 11/2004 | Slutsky et al. |
| 2005/0015913 | A1 | 1/2005 | Kim et al. |
| 2005/0166356 | A1 | 8/2005 | Uehigashi |
| 2005/0183230 | A1 | 8/2005 | Uehigashi |
| 2006/0185690 | A1 | 8/2006 | Song |
| 2007/0261715 | A1 | 11/2007 | Lee et al. |
| 2008/0282490 | A1 | 11/2008 | Oh |
| 2009/0281861 | A1 | 11/2009 | Miller et al. |
| 2010/0031463 | A1 | 2/2010 | Adams et al. |
| 2011/0202175 | A1 | 8/2011 | Romanov et al. |
| 2012/0084938 | A1 | 4/2012 | Fu |
| 2012/0125363 | A1 | 5/2012 | Kim et al. |
| 2013/0096717 | A1 | 4/2013 | Yoon et al. |
| 2013/0263889 | A1 | 10/2013 | Yoon et al. |
| 2014/0130289 | A1 | 5/2014 | Hyun et al. |
| 2014/0209122 | A1 | 7/2014 | Jung et al. |
| 2015/0142169 | A1 | 5/2015 | Kim et al. |
| 2015/0143646 | A1 | 5/2015 | Jeong et al. |
| 2015/0150429 | A1 | 6/2015 | Yoo et al. |
| 2015/0182090 | A1 | 7/2015 | Park et al. |
| 2015/0196183 | A1 | 7/2015 | Clark et al. |
| 2015/0342431 | A1 | 12/2015 | Zydek |
| 2016/0022109 | A1 | 1/2016 | Dooley et al. |
| 2016/0051108 | A1 | 2/2016 | Huang et al. |
| 2016/0296092 | A1 | 10/2016 | Wolfe et al. |
| 2018/0003265 | A1 | 1/2018 | Jung |
| 2018/0120833 | A1 | 5/2018 | Lindhe et al. |
| 2019/0270124 | A1 | 9/2019 | Jang et al. |

FOREIGN PATENT DOCUMENTS

| | | |
|---|---|---|
| CN | 1823677 | 8/2006 |
| CN | 2817718 U | 9/2006 |
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 102934968 A | 2/2013 |
| CN | 103006153 | 4/2013 |
| CN | 203113255 U | 8/2013 |
| CN | 203296009 U | 11/2013 |
| CN | 103418127 A | 12/2013 |
| CN | 203314896 U | 12/2013 |
| CN | 103717117 A | 4/2014 |
| CN | 203763007 U | 8/2014 |
| CN | 104088799 A | 10/2014 |
| CN | 203947323 U | 11/2014 |
| CN | 104244794 A | 12/2014 |
| CN | 203987872 U | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 0 879 009 B1 | 8/2000 |
| EP | 1 695 652 A1 | 8/2006 |
| EP | 2702918 A1 | 3/2014 |
| EP | 2 756 787 A1 | 7/2014 |
| EP | 2762051 A2 | 8/2014 |
| EP | 2 875 768 A1 | 5/2015 |
| EP | 3485785 | 5/2019 |
| JP | H03123522 | 5/1991 |
| JP | H05-300860 | 11/1993 |
| JP | H11-178764 | 7/1999 |
| JP | 2000-051128 | 2/2000 |
| JP | 2000070203 A | 3/2000 |
| JP | 2001-299656 A | 10/2001 |
| JP | 2002-51836 A | 2/2002 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |

(56) References Cited

FOREIGN PATENT DOCUMENTS

| | | |
|---|---|---|
| KR | 20-0435111 U | 1/2007 |
| KR | 10-0822785 | 4/2008 |
| KR | 10-0864697 B1 | 10/2008 |
| KR | 10-2009-0026031 | 3/2009 |
| KR | 10-20090086657 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 100962121 B1 * | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |
| KR | 10-20130042423 | 4/2013 |
| KR | 10-1303159 | 9/2013 |
| KR | 10-2013-0129059 | 11/2013 |
| KR | 10-20140022472 | 2/2014 |
| KR | 10-2014-0093369 A | 7/2014 |
| KR | 10-2015-0014351 | 2/2015 |
| KR | 10-2015-0022133 | 3/2015 |
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-20150078094 | 7/2015 |
| KR | 10-2015-0107396 | 9/2015 |
| KR | 10-2015-0107693 | 9/2015 |
| KR | 10-2015-0116311 | 10/2015 |
| KR | 10-1569058 | 11/2015 |
| KR | 101569058 B1 * | 11/2015 |
| KR | 10-2015-0139111 | 12/2015 |
| KR | 10-1578887 | 12/2015 |
| KR | 10-1595727 | 2/2016 |
| KR | 10-20160033615 | 3/2016 |
| KR | 10-1613446 B1 | 4/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO97/28731 A1 | 8/1997 |
| WO | WO 2015/186944 A1 | 12/2015 |
| WO | WO 2016/027957 | 2/2016 |
| WO | WO 2016/036183 A1 | 3/2016 |

OTHER PUBLICATIONS

KR100962121B1 Machine Translation (Year: 2010).*
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.
PCT Search Report dated Sep. 28, 2017, on PCT International Patent appl. No. PCT/KR2017/007549.
PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
PCT Search Report dated Nov. 20, 2017, on PCT International Patent Application No. PCT/KR2017/007551.
European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Taiwan Office Action dated May 22, 2020, on Taiwan Patent Application No. 107101298.
European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.
U.S. Office Action dated Jan. 28, 2021, on U.S. Appl. No. 16/333,147.
Chinese Office Action dated Aug. 12, 2020, on Chinese Patent Application No. 201780056687.2.

* cited by examiner

CLEANER WASHING APPARATUS

CROSS-REFERENCE TO RELATED APPLICATIONS

This application is a Divisional Application of U.S. patent application Ser. No. 16/333,098, filed Mar. 13, 2019, which is a U.S. National Phase entry under 35 U.S.C. § 371 from PCT International Application No. PCT/KR2017/007549, filed Jul. 14, 2017, which claims the benefit of priority of U.S. Provisional Application No. 62/362,358, filed Jul. 14, 2016, the contents of all of which are incorporated herein by reference in their entireties.

DESCRIPTION

Technical Field

The present invention relates to a washing apparatus of a cleaner which performs mopping.

Background Art

In general, a mop cleaner depends largely on human labor and, since a user should perform cleaning operation by reciprocating a mop unit while applying force thereto, the user may suffer fatigue and cleaning is not efficient when cleaning is performed for a long time.

In order to solve the above problems, a cleaner which automatically performs mopping has been developed, and a robot cleaner which may perform mopping has recently been developed.

Further, as assistant tools to easily and simply wash a cleaner after cleaning, various washing apparatuses have been developed.

DISCLOSURE

Technical Problem

Therefore, the present invention has been made in view of the above problems, and it is a first object of the present invention to provide a cleaner washing apparatus which effectively washes a cleaner.

It is a second object of the present invention to provide a cleaner washing apparatus which easily and conveniently controls washing operation of a cleaner.

It is a third object of the present invention to provide a cleaner washing apparatus which effectively washes a cleaner provided with a rotatable mop unit at the lower portion thereof.

Objects of the present invention are not limited to the above-described objects, and other objects which are not described herein may be readily understood by those in the art from the description below.

Technical Solution

A washing apparatus in accordance with an aspect of the present invention is configured to wash a cleaner having a mop unit formed at a lower portion thereof. In order to solve the above and other objects, the washing apparatus includes a tray configured to form a space to receive the cleaner and washing water, and a washing unit disposed at a lower portion of the inside of the tray so as to contact the mop unit. The washing unit includes a first spinning mop protrusion line configured to protrude upwardly, an upper end of the first spinning mop protrusion line being inclined downwardly in a first direction.

A washing apparatus in accordance with another aspect of the present invention is configured to wash a cleaner having at least one a mop unit formed at a lower portion thereof to be rotated. In order to solve the above and other objects, the washing apparatus includes a tray configured to form a space to receive the cleaner and washing water, and a washing unit disposed at a lower portion of the inside of the tray so as to contact the at least one mop unit. The washing unit includes at least one protrusion line configured to protrude upwardly and extend while traversing a moving direction of a lower surface of the at least one mop unit when the at least one mop unit is rotated. The at least one mop unit includes a first mop unit, a lower surface of the first mop unit being inclined downwardly in a first direction. The at least one protrusion line includes a left spinning mop protrusion line, a part of the left spinning mop protrusion line contacting the first mop unit being inclined downwardly in the first direction.

A washing control apparatus in accordance with yet another aspect of the present invention includes a controller configured to control a washing apparatus to wash a cleaner having at least one a mop unit formed at a lower portion thereof to be rotated. In order to solve the above and other objects, the washing apparatus includes a tray configured to form a space to receive the cleaner and washing water and a washing unit disposed at a lower portion of the inside of the tray so as to contact the at least one mop unit, and the controller controls the at least one mop unit to rotate the at least one mop unit under the condition that the cleaner and washing water are received in a tray and thereafter to rotate the at least one mop unit under the condition that the washing water in the tray is drained.

A control method of a washing control apparatus in accordance with a further aspect of the present invention is configured to control a washing apparatus to wash a cleaner having at least one a mop unit formed at a lower portion thereof to be rotated. In order to solve the above and other objects, the control method of the washing control apparatus includes performing a washing operation configured to rotate the at least one mop unit under the condition that the cleaner and washing water are received in a tray, and performing a spin-drying operation configured to rotate the at least one mop unit at a higher rotational speed than a rotational speed of the at least one mop unit in the performing the washing operation under the condition that the washing water in the tray is drained The details of other aspects will be included in the detailed description and the drawings below.

Advantageous Effects

A washing apparatus in accordance with the present invention includes a washing unit including a first spinning mop protrusion line protruding upwardly and having an upper end which is inclined downwardly in a first direction, and, when the washing apparatus washes a cleaner including a first mop unit provided to be inclined to one side, the washing unit contacts the mop unit at a proper pressure and frictional force is generated on a contact surface by such contact. Therefore, a structure to effectively separate foreign substances attached to the mop unit from the mop unit is provided and, thus, washing performance of the washing apparatus is improved.

Further, the first mop unit is rotated while maintaining contact with the first spinning mop protrusion line, and washing is carried out without a separate driving device in the washing apparatus.

A washing control apparatus in accordance with the present invention includes the cleaner, the washing apparatus, and a controller configured to control the mop unit to rotate the mop unit under the condition that the cleaner and washing water are received in a tray and thereafter to rotate the mop unit under the condition that the washing water in the tray is drained, thus easily and conveniently controlling a washing operation of the cleaner and effectively achieving washing.

A control method of the washing control apparatus in accordance with the present invention is executed to control the washing apparatus to wash the cleaner having at least one mop unit formed at the lower portion thereof to be rotated, and includes performing a washing operation configured to rotate the at least one mop unit under the condition that the cleaner and washing water are received in the tray, and performing a spin-drying operation configured to rotate the at least one mop unit at a higher rotational speed than a rotational speed in the performing the washing operation under the condition that the washing water in the tray is drained, thus rotating the mop unit at proper speeds according to the respective operations and improving a washing function and a rinsing function of the washing control apparatus.

Effects of the present invention are not limited to the above-described effects, and other effects may be readily understood by those skilled in the art from the accompanying claims.

BEST MODE

Figure 1:
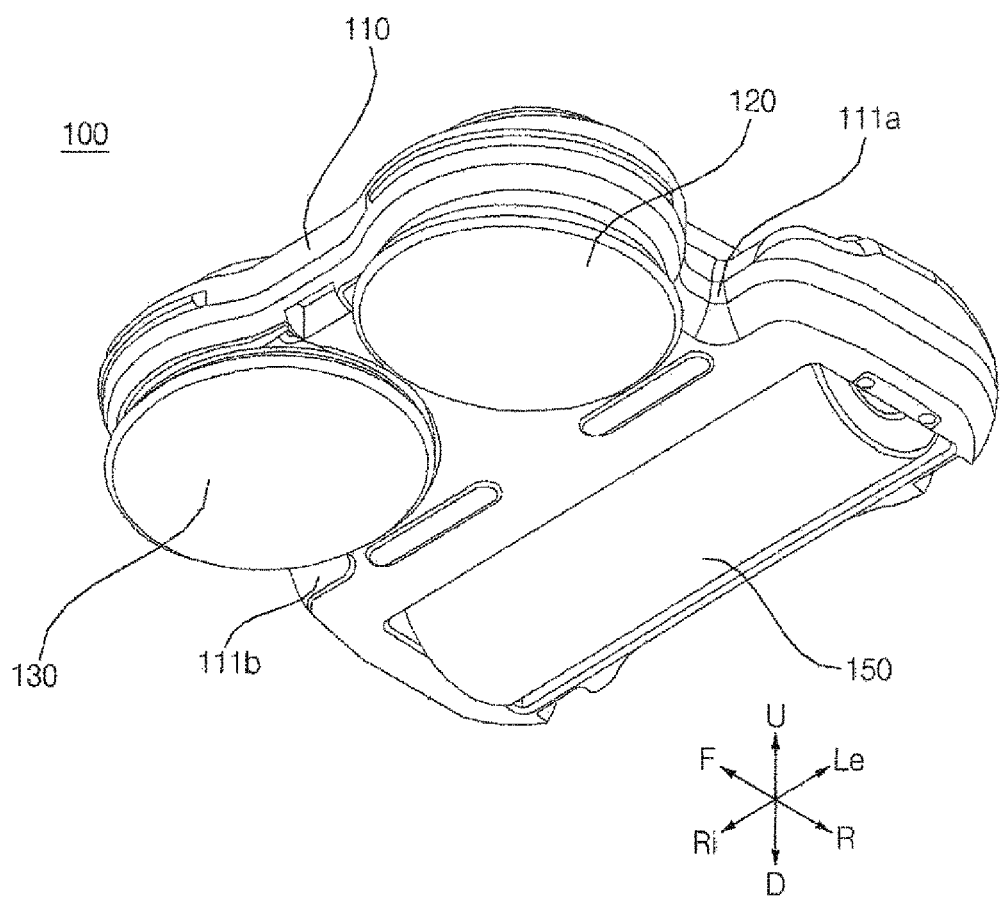
FIG. 1 is a perspective view of a cleaner (100) in accordance with one embodiment of the present invention.

Wherever possible, the same reference numbers will be used throughout the drawings to refer to the same or like parts.

In the following description of the present invention, expressions referring to directions, such as "front (F)/rear (R)/left (Le)/right (Ri)/up (U)/down (D)" will be defined as displayed in the drawings only to give clear understanding of the present invention, but the respective directions may be differently defined depending on a reference point.

Water flowing into a washing apparatus 200 to wash a cleaner 100, water used for washing, and water on which foreign substances float after washing correspond to water for washing and will thus be referred to as 'washing water'.

In the following description of the present invention, it will be understood that terms, such as 'first', 'second', etc., are used only to discriminate elements from each other and have no concern with a sequence, importance or a master-servant relationship among the elements. For example, a second element alone may be described without a first element.

In the following description of the present invention, the term 'mop' may be applied to various materials, such as fabric, paper, etc., and include a mop that is repetitively usable by washing or a disposable mop.

Figure 2:
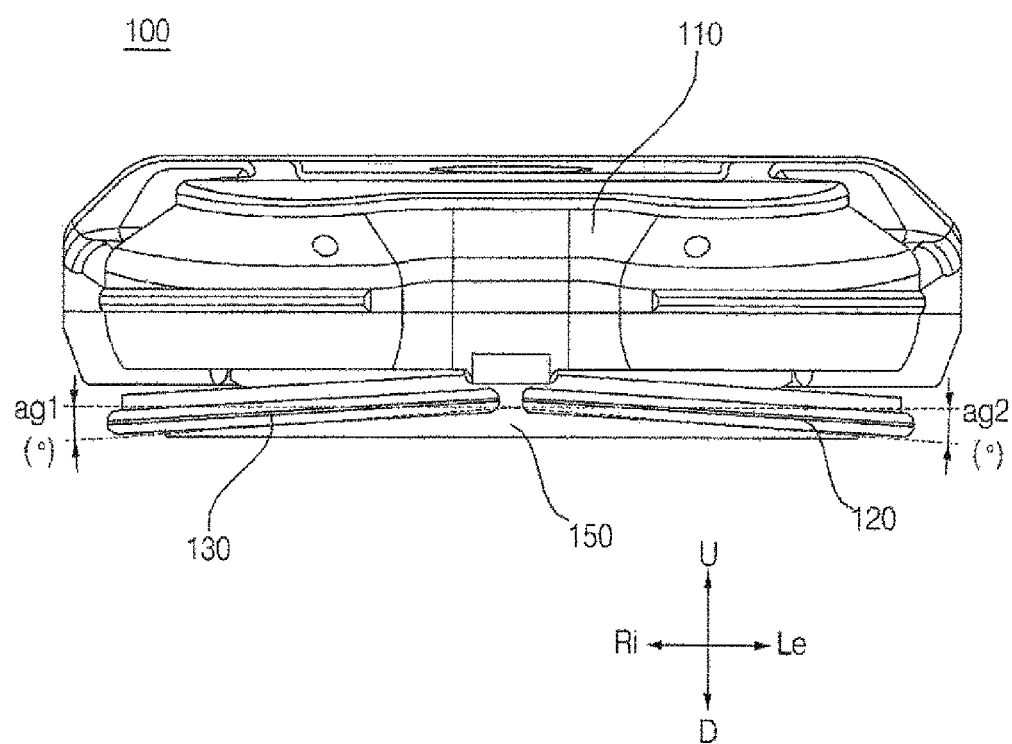
FIG. 2 is a front view of the cleaner (100) of FIG. 1.

Hereinafter, referring to FIGS. 1 and 2, a cleaner 100 which a washing apparatus 200 in accordance with one embodiment of the present invention washes will be described.

The cleaner 100 in accordance with one embodiment of the present invention includes a body 110 having a controller 170. The cleaner 100 includes spinning mop units 120 and 130 supporting the body 110. The cleaner 100 includes a rolling mop unit 150 supporting the body 110. The body 110 is supported by the spinning mop units 120 and 130 and the rolling mop unit 150.

The body 110 forms the external appearance of the cleaner 100. The body 110 may be formed through coupling between an upper body part and a lower body part.

The body 110 is provided with the spinning mop units 120 and 130 on the lower surface thereof. The body 110 is provided with the rolling mop unit 150 on the lower surface thereof. The body 110 may include a sensor to sense traveling information of the cleaner on the lower surface thereof. The body 110 may include a sensor to sense the state of a floor surface.

The body 110 may have a bumper formed on the side surface thereof to relieve impact during front or side collusion. The body 110 may include a sensor to sense a front or side collusion on the side surface thereof.

The body 110 includes guide correspondent parts 111 provided to be engaged with position guides 211 which will be described below. In this embodiment, the guide correspondent parts 111 have grooves extending in the vertical direction, formed by denting one side surface of the body 11. In another embodiment, the guide corresponding parts 111 may have holes formed through the body 110 in the vertical direction.

The guide correspondent parts 111 include a left guide correspondent part 111 formed by denting the left side surface of the body 110 in the rightward direction. The guide correspondent parts include a 111 right guide correspondent part 111 formed by denting the right side surface of the body 110 in the leftward direction.

The guide correspondent parts 111 are disposed between the spinning mop units 120 and 130 and the rolling mop unit 150. The left guide correspondent part 111 is disposed between the left spinning mop unit 120 and the rolling mop unit 150. The right guide correspondent part 111 is disposed between the right spinning mop unit 130 and the rolling mop unit 150.

The body 110 may include an input unit formed at the upper portion thereof to input instructions to the cleaner 100, and a display unit to display the state and operation of the cleaner 100. The body 110 may include a tub installed at the upper portion thereof to receive water so as to perform wet mopping.

The body 110 includes driving devices installed therein to drive the mop units 120, 130 and 150. The body 110 may include the controller 170 to control the cleaner 100 and/or other devices connected thereto, and may be provided with a plurality of other devices.

The spinning mop units 120 and 130 are provided to contact a floor so as to mop the floor. The spinning mop units 120 and 130 include a left spinning mop unit 120 and a right spinning mop unit 130 provided to perform mopping by rotation in the clockwise direction or the counterclockwise direction, as seen from above. The left spinning mop unit and the right spinning mop unit 130 are provided to contact the floor. A pair of the spinning mop units 120 and 130 is disposed at the lower portion of the body 110. A pair of the spinning mop units 120 and 130 is disposed in front of the rolling mop unit 150. The cleaner 100 may be provided such that the body 110 is movable by the rotating motion of the spinning mop units 120 and 130 without separate wheels.

A pair of the spinning mop units 120 and 130 is formed to have an approximately disc shape. A pair of the spinning mop units 120 and 130 is provided at the left and right sides of the front region of the lower portion of the body 119.

Each of the spinning mop units 120 and 130 is rotated around a spinning rotation axis thereof. The left spinning mop unit 120 is rotated around a left spinning rotation axis. The right spinning mop unit 130 is rotated around a right spinning rotation axis. The spinning rotation axes are respectively perpendicular to the lower surfaces of the spinning mop units 120 and 130. A pair of the spinning rotation axes may be disposed to be parallel to the vertical direction or to be tilted to one side. In this embodiment, the left spinning rotation axis is tilted to one side to form an acute angle of less than 45 degrees with the vertical direction, and the right spinning rotation axis is tilted to the other side to form an acute angle of less than 45 degrees with the vertical direction.

A pair of the spinning mop units 120 and 130 may be configured such that an angle formed by the tilted direction of the left spinning rotation axis and the tilted direction of the right spinning rotation axis, as seen from above, is 180 degrees or less. A pair of the spinning mop units 120 and 130 may be provided such that the left and right spinning rotation axes are symmetrical. In this embodiment, the tilted direction of the left spinning rotation axis and the tilted direction of the right spinning rotation axis are opposite to each other, as seen from above. That is, the tilted direction of the left spinning rotation axis and the tilted direction of the right spinning rotation axis form an angle of 180 degrees.

A pair of the spinning mop units 120 and 130 may include the left spinning mop unit 120 disposed at the left and the right spinning mop unit 130 disposed at the right, and the left spinning mop unit 120 and the right spinning mop unit 130 may be provided to be symmetrical.

In this embodiment, the lower surface of the left spinning mop unit 120 is inclined downwardly to the left and thus forms a tilt angle Ag1. The lower surface of the right spinning mop unit 130 is inclined downwardly to the right and thus forms a tilt angle Ag2. Although not shown in the drawings, in another embodiment, a pair of spinning mop units 120 and 130 may be provided such that the lower surfaces thereof are parallel to a floor surface.

The rolling unit 150 is s formed to have an approximately cylindrical shape, and is rotated around a rolling rotation axis extending in the leftward and rightward directions. In this embodiment, the rolling rotation axis extends in the leftward and rightward directions, but, in other embodiments, the rolling rotation axis may extend in the forward and backward directions or extend in a direction between the forward and backward directions and the leftward and rightward directions.

The rolling mop unit 150 is provided to contact the floor. The rolling mop unit 150 may be provided to contact and mop the floor. The rolling mop unit 150 is disposed at the lower portion of the body 110. The rolling mop unit 150 is provided at the rear of the spinning mop units 120 and 130 so as to contact the floor. In this embodiment, the rolling mop unit 150 is provided to perform mopping while being rotated. The rolling mop unit 150 is rotated in the clockwise direction or the counterclockwise direction, as seen from the right.

Hereinafter, referring to FIG. 3 and subsequent figures, the washing apparatus 200 in accordance with this embodiment will be described.

Figure 3:
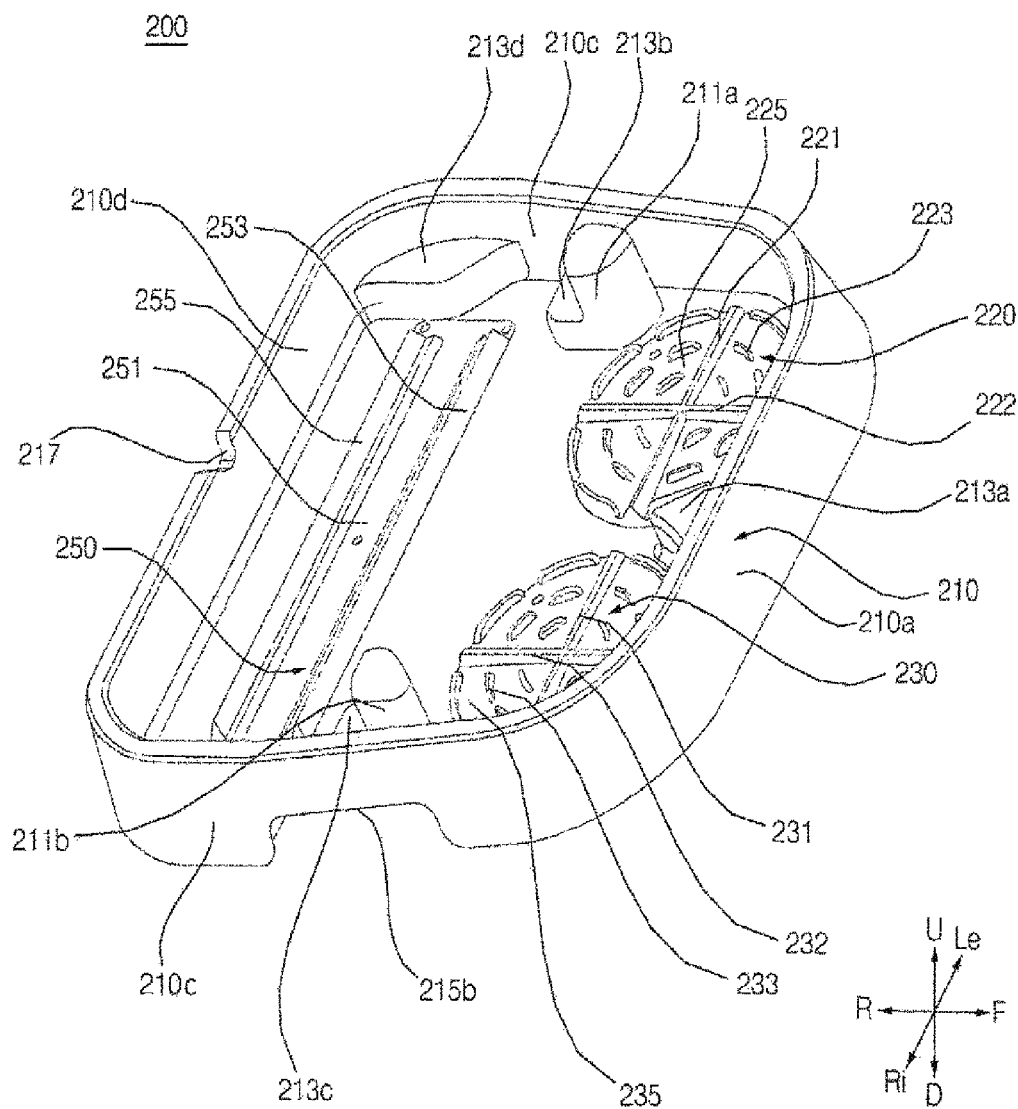
FIG. 3 is a perspective view of a washing apparatus (200) in accordance with one embodiment of the present invention.
Figure 4:
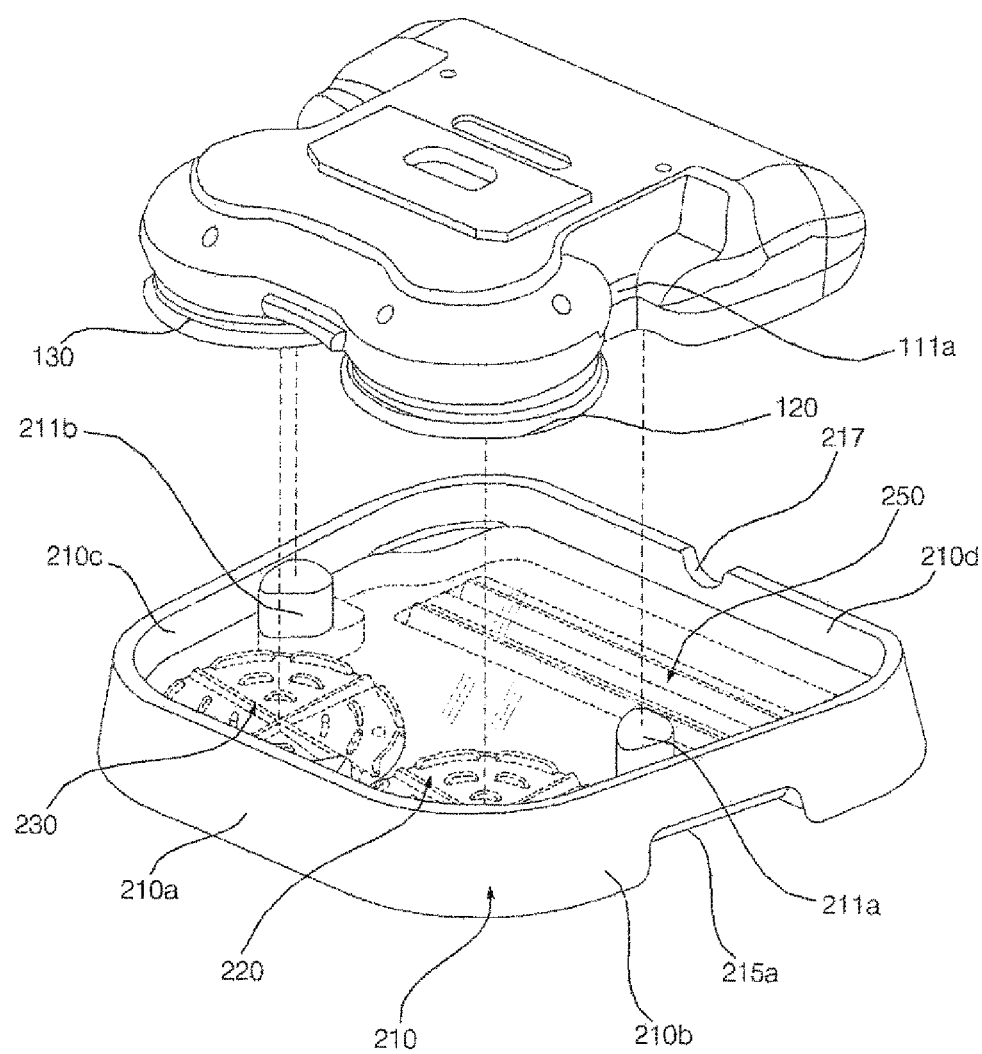
FIG. 4 is a perspective view illustrating a position of the washing apparatus (200) of FIG. 3 at which the cleaner (100) of FIG. 1 which is disposed.

Referring to FIG. 3, the washing apparatus 200 in accordance with this embodiment includes a tray 210 forming a space in which the cleaner 100 and washing water are received. The washing apparatus 200 includes washing units 220, 230 and 250 disposed at the lower portion of the inner surface of the tray 210 so as to contact the mop units 120, 130 and 150.

The tray 210 is formed to have an approximately hexahedral shape, the upper surface of which is open. The inside of the tray 210 is formed of a waterproof material. A pair of spinning mop washing units 220 and 230 is disposed at the lower portion of the inner surface of the tray 210 so as to contact a pair of the spinning mop units 120 and 130. A rolling mop washing unit 250 is disposed in the tray 210 so as to contact the rolling mop unit 150.

The tray 210 has a front side wall 210a, a left side wall 210b, a right side wall 210c and a rear side wall 210d. The position guides 211 having the shape of a protrusion extending are formed on the inner upwardly surface of the tray 210. The position guides 211 are inserted into the guide correspondent parts 111 formed on the body 110 of the cleaner 100, thus guiding the position of the cleaner 100 disposed on the washing apparatus 200.

The position guides 211 are provided within the tray 210 adjacent to the left side wall 210b and the right side wall 210c. The position guides 211 protrude upwardly from the bottom surface of the tray. The position guides 211 are provided such that the upper ends thereof protrude farther upward than the upper end of the tray 210, and thus easily guide the cleaner 100 to the washing apparatus 200.

Receipt height guides 213 are formed in the tray 210. The receipt height guides 213 support the cleaner 100 from below so that the cleaner 100 is located at a designated height when the cleaner 100 is disposed on the tray 210.

The upper surfaces of the receipt height guides 213 are flat and have a designated area so as to support the cleaner 100. The receipt height guides 213 protrude inwardly from the four side walls 210a, 210b, 210c and 210c of the tray 210. A plurality of receipt height guides 213 may be provided.

Figure 5:
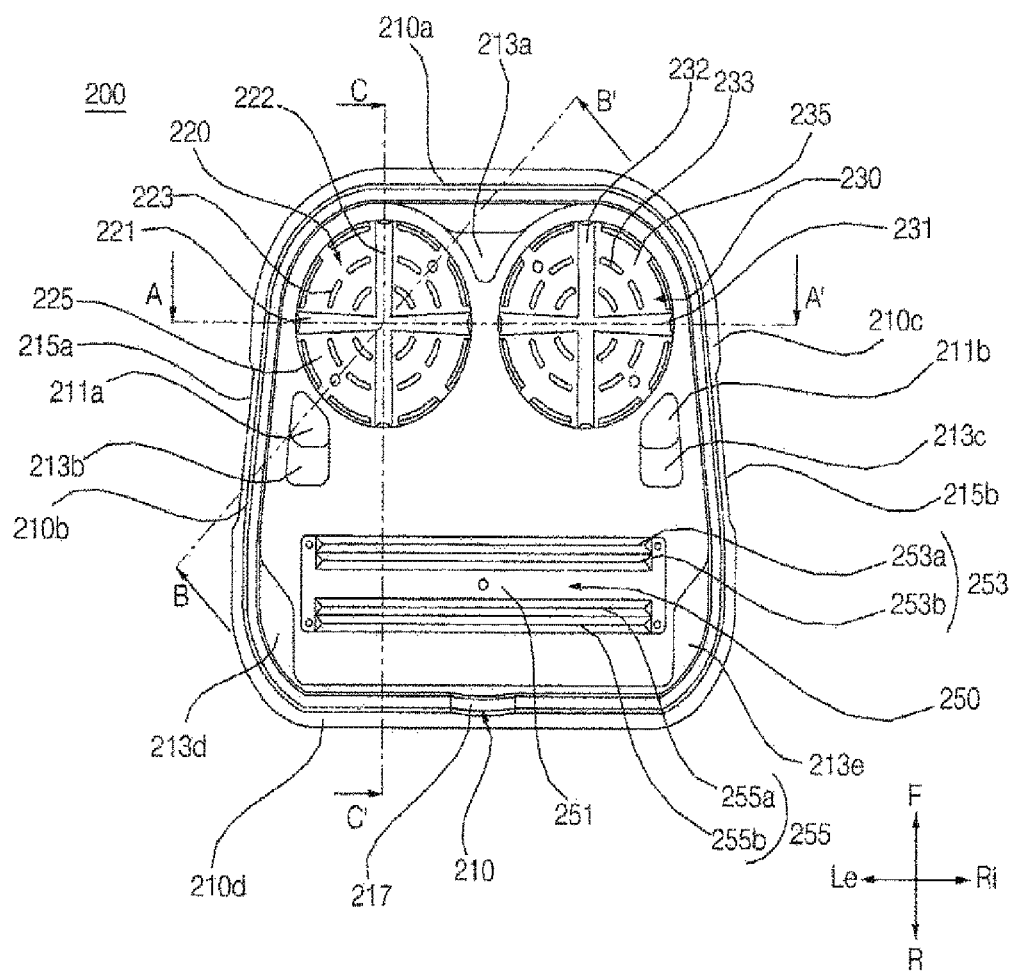
FIG. 5 is a plan view of the washing apparatus (200) of FIG. 3.

Referring to FIGS. 3 and 5, the receipt height guides 213 include a receipt height guide 213a connected to the front side wall 210a of the tray 210. The receipt height guides 213 include receipt height guides 213b and 213c disposed adjacent to the left side wall 210b and the right wall 210c of the tray. The receipt height guides 213 include a receipt height guide 213*d* disposed at the rear region of the left side of the tray 210 and connected to the left side wall 210*b* and the rear side wall 210*d*. The receipt height guides 213 include a receipt height guide 213*e* disposed at the rear region of the right side of the tray 210 and connected to the right side wall 210*c* and the rear side wall 210*d*. The receipt height guides 213 disposed at the left and right sides may be formed integrally with the position guides 211.

The receipt height guides 213 support the cleaner 100 from below and thus distribute the load of the cleaner 100 to the washing units 220, 230 and 250 and the receipt height guides 213, and prevent generation of excessive frictional force due to concentration of the load on the washing units 220, 230 and 250 and thus allow the washing units 220, 230 and 250 to efficiently perform washing.

An overflow hole 217 is formed at the upper end of one side surface of the tray 210 by denting a part of the tray 210. The overflow hole 217 prevents the inside of the tray 210 from being filled with washing water to a designated height or above, and thus prevents a part of the cleaner 100 which reaches the designated height or above from contacting washing water and guides overflown water in a specific direction.

The tray 210 includes handles 215*a* and 215*b* formed at the left and right sides of the outer surface thereof so that a user may easily carry the washing apparatus 200.

The tray 210 further includes a water supply device 260 (not shown) and a drainage device 270 (not shown) so that washing water may be supplied or drained manually or automatically.

The water supply device 260 may include a detergent receipt unit (not shown). Washing water flowing to the water supply device 260 may be mixed with a detergent received in the detergent receipt unit, and the washing water in which the detergent is dissolved may be introduced into the tray 210.

Coupling spaces having a designated depth are formed at positions of the tray 210 where the washing units 220, 230 and 250 will be disposed, so that the washing units 220, 230 and 250 are inserted into and thus coupled to the coupling spaces.

Hereinafter, referring to FIG. 3 and the subsequent figures, the washing units in accordance with one embodiment of the present invention will be described.

A plurality of washing units 220, 230 and 250 may be provided. The washing units 220, 230 and 250 include a left spinning mop washing unit 220 disposed at the left side of the front region of the lower portion of the inside of the tray 210. The washing units 220, 230 and 250 include a right spinning mop washing unit 230 disposed at the right side of the front region of the lower portion of the inside of the tray 210. The washing units 220, 230 and 250 include a rolling mop washing unit 250 disposed at the rear region of the lower portion of the inside of the tray 210.

Figure 7:
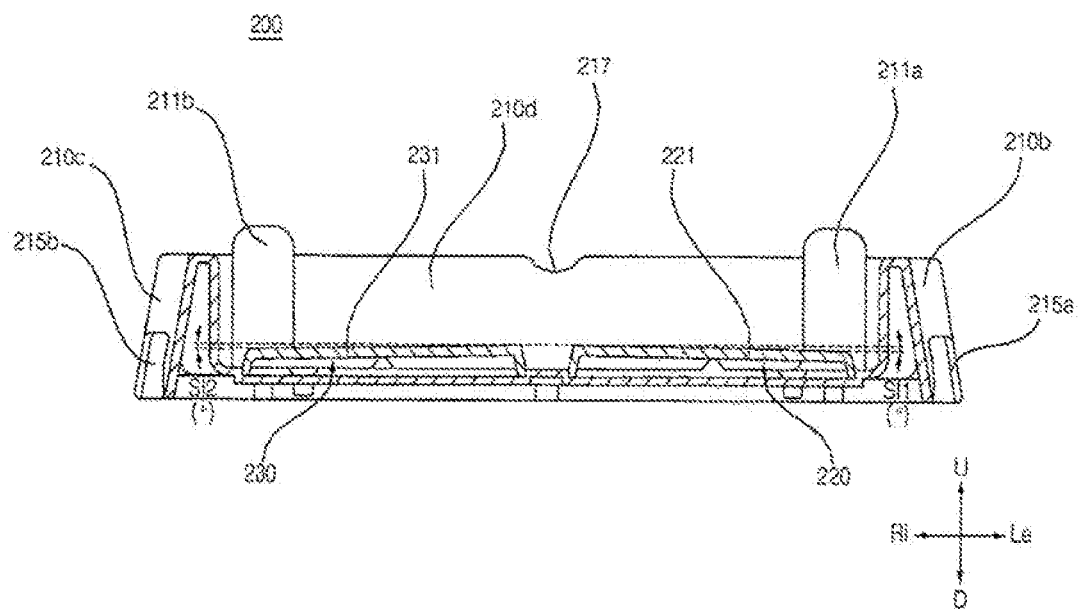
FIG. 7 is a cross-sectional view of the washing apparatus (200) of FIG. 5, taken along line A-A'.
Figure 9:
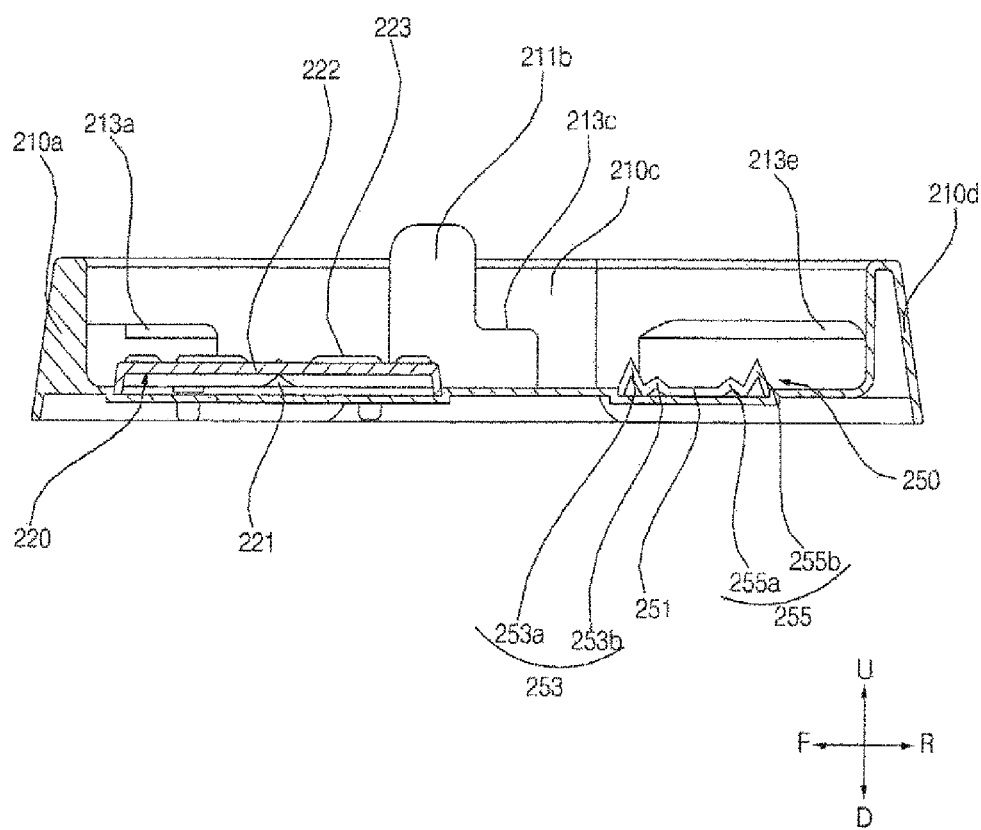
FIG. 9 is a cross-sectional view of the washing apparatus (200) of FIG. 5, taken along line C-C'.

Referring to FIGS. 7 and 9, the washing units 220, 230 and 250 are partially inserted into and coupled to the coupling having the designated depth, which are formed at the positions of the tray 210 where the washing units 220, 230 and 250 will be disposed, and the washing units 220, 230 and 250 may be temporarily fixed to the tray 210 and firmly coupled to the tray 210, simultaneously. The washing units 220, 230 and 250 are coupled to the tray 210 by fastening bolts to grooves formed in the tray 210, thus being fixed.

Referring to FIG. 3, a pair of the spinning mop washing units 220 and 230 includes the left spinning mop washing unit 220 and the right spinning mop washing unit 230. A pair of the spinning mop washing units 220 and 230 is formed to have an approximately disc shape corresponding to the shape of a pair of the spinning mop units 120 and 130.

Among elements of a pair of the spinning mop washing units 220 and 230, the elements to which 'left' is added mean elements to wash the left spinning mop unit 120, and the elements to which 'right' is added mean elements to wash the right spinning mop unit 130. In the below description of the elements of a pair of the spinning mop washing units 220 and 230, if the terms 'left' and 'right' are not used, the corresponding description may be applied to both the 'left' and 'right' spinning mop washing units.

A pair of the spinning mop washing units 220 and 230 may be provided such that the left spinning mop washing unit 220 and right spinning mop washing unit 230 are symmetrical.

A pair of the spinning mop washing units 220 and 230 is provided such that a plurality of protrusion lines 221, 222, 231 and 232 protrudes upwardly from the upper surfaces of the spinning mop washing units 220 and 230. The spinning mop protrusion lines 221, 222, 231 and 232 are configured such that the width of the upper portions thereof is narrower than the width of the lower portions thereof. The spinning mop protrusion lines 221, 222, 231 and 232 may be provided such that the corners of the ends thereof are not vertical but form an obtuse angle.

The left spinning mop washing unit 220 has a left spinning mop protrusion line 221. The left spinning mop washing unit 220 has a left spinning mop auxiliary protrusion line 222. The left spinning mop washing unit 220 has a left spinning mop circumferential protrusion unit 223.

The right spinning mop washing unit 230 has a right spinning mop protrusion line 231. The right spinning mop washing unit 230 has a right spinning mop auxiliary protrusion line 232. The right spinning mop washing unit 230 has a right spinning mop circumferential protrusion unit 233.

The left spinning mop washing unit 220 is disposed such that the left spinning mop protrusion line 221 and the left spinning mop auxiliary protrusion line 222 may contact the left spinning mop unit 120. The left spinning mop unit 120 is rotated under the condition that it contacts the left spinning mop protrusion line 221 and the left spinning mop auxiliary protrusion line 222, and foreign substances attached to the left spinning mop unit 120 are separated from the left spinning mop unit 120 by friction.

The right spinning mop washing unit 230 is disposed such that the right spinning mop protrusion line 231 and the right spinning mop auxiliary protrusion line 232 may contact the right spinning mop unit 130. The right spinning mop unit 130 is rotated under the condition that it contacts the right spinning mop protrusion line 231 and the right spinning mop auxiliary protrusion line 232, and foreign substances attached to the right spinning mop unit 130 are separated from the right spinning mop unit 130 by friction.

In one embodiment of the present invention, the upper end of the left spinning mop protrusion line 221 is inclined downwardly in a first direction, and the upper end of the right spinning mop protrusion line 231 is inclined downwardly in a second direction.

The left spinning mop protrusion line 221 and the right spinning mop protrusion line 231 may be provided such that an angle formed by the first direction and the second direction is less than 180 degrees, as seen from above. The left spinning mop protrusion line 221 may be provided such that the first direction forms an acute angle of less than 90 degrees to the left based on a virtual axis disposed in the forward and backward directions, as seen from above. The right spinning mop protrusion line 231 may be provided such that the second direction forms an acute angle of less than 90 degrees to the right based on the virtual axis, as seen from above. The value of the angle formed between the first direction and the above axis and the value of the angle formed between the second direction and the axis may be equal.

The left spinning mop protrusion line 221 and the right spinning mop protrusion line 231 may be provided in the opposite directions such that the first direction is formed leftward and the second direction is formed rightward, as seen from above.

The left spinning mop auxiliary protrusion line 222 extends while traversing the left spinning mop protrusion line 221, and the right spinning mop auxiliary protrusion line 232 extends while traversing the right spinning mop protrusion line 231.

Referring to FIGS. 5 and 7, the left spinning mop protrusion line 221 in accordance with one embodiment of the present invention extends in the leftward and rightward directions. The left spinning mop protrusion line 221 is inclined downwardly to the left and thus has a first tilt angle S11. The left spinning mop auxiliary protrusion line 222 extends in the forward and backward directions. The left spinning mop auxiliary protrusion line 222 is formed without an inclination.

The left spinning mop protrusion line 221 is divided into a left spinning mop protrusion line left part 221a extending to the left and a left spinning mop protrusion line right part 221b extending to the right from an intersection between the left spinning mop protrusion line 221 and the left spinning mop auxiliary protrusion line 222. The left spinning mop auxiliary protrusion line 222 is divided into a left spinning mop auxiliary protrusion line front part 222a extending to the front and a left spinning mop auxiliary protrusion line rear part 222b extending to the rear from the intersection.

The right spinning mop protrusion line 231 extends in the leftward and rightward directions. The right spinning mop protrusion line 231 is inclined downwardly to the right and thus has a second tilt angle S12. The right spinning mop auxiliary protrusion line 232 extends in the forward and backward directions. The right spinning mop auxiliary protrusion line 232 is formed without an inclination.

The right spinning mop protrusion line 231 is divided into a right spinning mop protrusion line left part 231a extending to the left and a right spinning mop protrusion line right part 231b extending to the right from an intersection between the right spinning mop protrusion line 231 and the right spinning mop auxiliary protrusion line 232. The right spinning mop auxiliary protrusion line 232 is divided into a right spinning mop auxiliary protrusion line front part 232a extending to the front and a right spinning mop auxiliary protrusion line rear part 232b extending to the rear from the intersection.

The left spinning mop protrusion line 221 and the left spinning mop auxiliary protrusion line 222 extend radially from the intersection between the left spinning mop protrusion line 221 and the left spinning mop auxiliary protrusion line 222 so as to be perpendicular to the rotating direction of the left spinning mop unit 120. Thereby, friction by contact between the left spinning mop unit 120 and the left spinning mop washing unit 220 is applied to the left spinning mop unit 120 in a direction completely opposite to the rotating direction thereof, and thus, foreign substances attached to the left spinning mop unit 120 are effectively separated from the left spinning mop unit 120.

The right spinning mop protrusion line 231 and the right spinning mop auxiliary protrusion line 232 extend radially from the intersection between the right spinning mop protrusion line 231 and the right spinning mop auxiliary protrusion line 232 so as to be perpendicular to the rotating direction of the right spinning mop unit 130. Thereby, friction by contact between the right spinning mop unit 130 and the right spinning mop washing unit 230 is applied to the right spinning mop unit 130 in a direction completely opposite to the rotating direction thereof, and thus, foreign substances attached to the right spinning mop unit 130 are effectively separated from the right spinning mop unit 130.

The left spinning mop protrusion line 221 is provided such that the first tilt angle S11 is the same as the tilt angle Ag1 of the left spinning mop unit 120. The right spinning mop protrusion line 231 is provided such that the second tilt angle S12 is the same as the tilt angle Ag2 of the right spinning mop unit 130. Thereby, a pair of the spinning mop units 120 and 130 may be rotated under the condition that the spinning mop protrusion lines 221 and 231 contact a pair of the spinning mop units 120 and 130, and foreign substances attached to a pair of the spinning mop units 120 and 130 may be effectively separated from the spinning mop units 120 and 130.

The left spinning mop protrusion line 221 may be formed such that the inclined direction of the left spinning mop unit 120 and the extending direction of the left spinning mop protrusion line 221 are parallel to each other, as seen from above. The right spinning mop protrusion line 231 may be formed such that the inclined direction of the right spinning mop unit 130 and the extending direction of the right spinning mop protrusion line 231 are parallel to each other, as seen from above. Here, the inclined direction is a direction in which an inclination is projected onto a horizontal plane, and the inclination represents an angle indicating an inclined degree of a structural surface.

In the above-described washing apparatus 200, the load of the cleaner 100 supported by the left spinning mop unit 120 is symmetrical with respect to the left spinning mop protrusion line 221 and is uniformly distributed to the left spinning mop protrusion line 221 and the left spinning mop auxiliary protrusion line 222, and the load of the cleaner 100 supported by the right spinning mop unit 130 is symmetrical with respect to the right spinning mop protrusion line 231 and is uniformly distributed to the right spinning mop protrusion line 231 and the right spinning mop auxiliary protrusion line 232.

Therefore, proper frictional force is applied to the spinning mop units 120 and 130 by the spinning mop protrusion lines 221 and 231 and the spinning mop auxiliary protrusion lines 222 and 232, and foreign substances are effectively removed, thus improving washing performance.

Further, since pressures which the spinning mop protrusion lines 221 and 231 apply to the spinning mop protrusion lines 221 and 231 and the spinning mop auxiliary protrusion lines 222 and 232 become uniform, the spinning mop units 120 and 130 are easily rotated and thus washing performance may be improved.

Both ends of the left spinning mop protrusion line 221 and the right spinning mop protrusion line 231 have different heights, both ends of the left spinning mop auxiliary protrusion line 222 and the right spinning mop auxiliary protrusion line 233 have the same height, and thus a pair of the spinning mop washing units 220 and 230 may be easily manufactured.

Although not shown in the drawings, in accordance with another embodiment of the present invention, the left spinning mop protrusion line 221 is formed so as not to be inclined. In accordance with yet another embodiment of the present invention, the right spinning mop protrusion line 231 is formed so as not to be inclined.

The left spinning mop washing unit 220 has the left spinning mop circumferential protrusion unit 223 extending in a circumferential direction centering on a virtual axis passing through the intersection between the left spinning mop protrusion line 221 and the left spinning mop auxiliary protrusion line 222. The right spinning mop washing unit 230 has the right spinning mop circumferential protrusion unit 233 extending in a circumferential direction centering on a virtual axis passing through the intersection between the right spinning mop protrusion line 231 and the right spinning mop auxiliary protrusion line 232.

The left spinning mop circumferential protrusion unit 223 has a plurality of protrusions formed on a plurality of concentric circles centering on the virtual axis passing through the intersection between the left spinning mop protrusion line 221 and the left spinning mop auxiliary protrusion line 222.

The right spinning mop circumferential protrusion unit 233 has a plurality of protrusions formed on a plurality of concentric circles centering on the virtual axis passing through the intersection between the right spinning mop protrusion line 231 and the right spinning mop auxiliary protrusion line 232.

Figure 6:
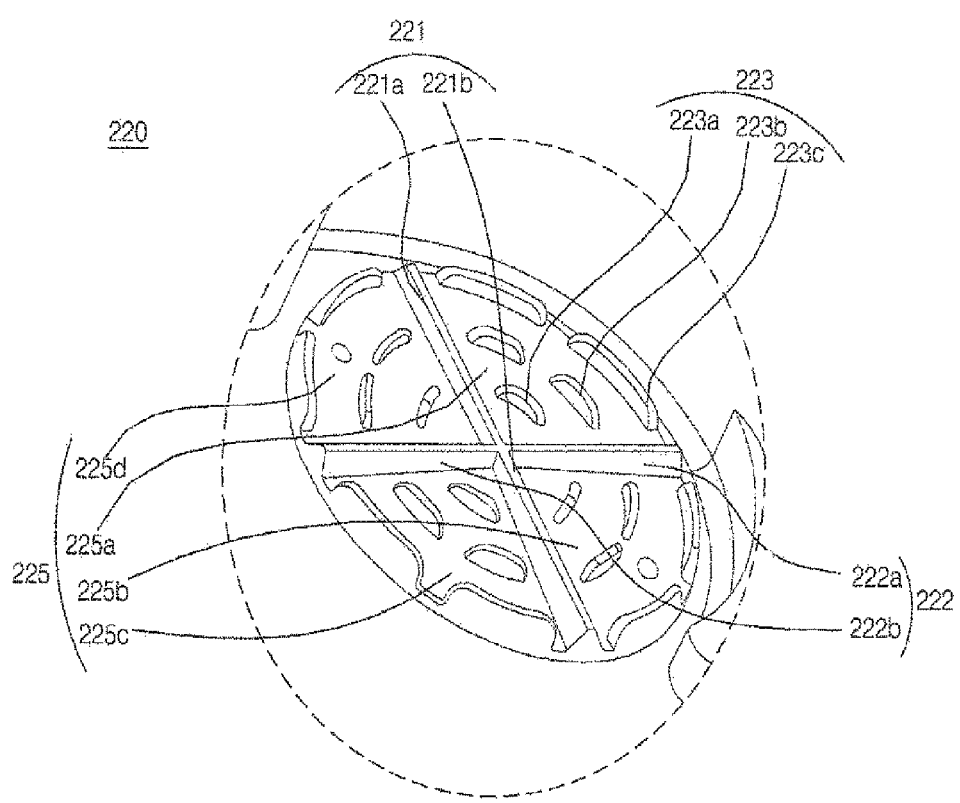
FIG. 6 is a partially enlarged perspective view of a left spinning mop washing unit (220) of the washing apparatus (200) of FIG. 3.

Referring to FIGS. 5 and 6, the left spinning mop circumferential protrusion unit 223 has first left spinning mop circumferential protrusions 223a on a concentric circle located at an innermost position centering on the virtual axis. The left spinning mop circumferential protrusion unit 223 has second left spinning mop circumferential protrusions 223b on a concentric circle located at a middle position centering on the virtual axis. The left spinning mop circumferential protrusion unit 223 has third left spinning mop circumferential protrusions 223c on a concentric circle located at an outermost position centering on the virtual axis.

The right spinning mop circumferential protrusion unit 233 has first right spinning mop circumferential protrusions 233a on a concentric circle located at an innermost position centering on the virtual axis. The right spinning mop circumferential protrusion unit 233 has second right spinning mop circumferential protrusions 233b on a concentric circle located at a middle position centering on the virtual axis. The right spinning mop circumferential protrusion unit 233 has third right spinning mop circumferential protrusions 233c on a concentric circle located at an outermost position centering on the virtual axis.

The spinning mop circumferential protrusion units 223 and 233 are formed such that the protruding heights of the protrusions thereof are lower than the height of the spinning mop protrusion lines 221 and 231. The spinning mop circumferential protrusion units 223 and 233 are formed such that the protruding heights of the protrusions thereof are lower than the height of the spinning mop auxiliary protrusion lines 222 and 232. These spinning mop circumferential protrusion units 223 and 233 assist the spinning mop protrusion lines 221 and 231 and the spinning mop auxiliary protrusion lines 222 and 232 in separating foreign substances from the spinning mop units 120 and 130, and form a water current in grooves formed between the protrusions, thus improving washing performance.

The spinning mop circumferential protrusion units 223 and 233 are formed such that the respective ends of the protrusions are spaced apart from the spinning mop protrusion lines 221 and 231. The spinning mop circumferential protrusion units 223 and 233 are formed such that the respective ends of the protrusions are spaced apart from the spinning mop auxiliary protrusion lines 222 and 233. These spinning mop circumferential protrusion units 223 and 233 effectively discharge foreign substances, which are separated from the spinning mop units 120 and 130 and float in the spinning mop washing units 220 and 230, to the outside, thus improving washing performance.

Referring to FIG. 5, spinning mop upper surfaces 225 and 235 of the spinning mop washing units 220 and 230, located at positions corresponding to the spinning mop units 120 and 130, are respectively partitioned into four portions by the spinning mop protrusion lines 221 and 231 and the spinning mop auxiliary protrusion lines 222 and 232.

The left spinning mop upper surface 225 has a first left spinning mop upper surface 225a at the front region of the left side thereof. The left spinning mop upper surface 225 has a second left spinning mop upper surface 225b at the front region of the right side thereof. The left spinning mop upper surface 225 has a third left spinning mop upper surface 225c at the rear region of the right side thereof. The left spinning mop upper surface 225 has a fourth left spinning mop upper surface 225d at the rear region of the left side thereof.

The right spinning mop upper surface 235 has a first right spinning mop upper surface 235a at the front region of the left side thereof. The right spinning mop upper surface 235 has a second right spinning mop upper surface 235b at the front region of the right side thereof. The right spinning mop upper surface 235 has a third right spinning mop upper surface 235c at the rear region of the right side thereof. The right spinning mop upper surface 235 has a fourth right spinning mop upper surface 235d at the rear region of the left side thereof.

The left spinning mop upper surface 225 may be formed such that the edge thereof is lower than the center thereof centering on the intersection between the left spinning mop protrusion line 221 and the left spinning mop auxiliary protrusion line 222. The right spinning mop upper surface 235 may be formed such that the edge thereof is lower than the center thereof centering on the intersection between the right spinning mop protrusion line 231 and the right spinning mop auxiliary protrusion line 232.

Figure 8:
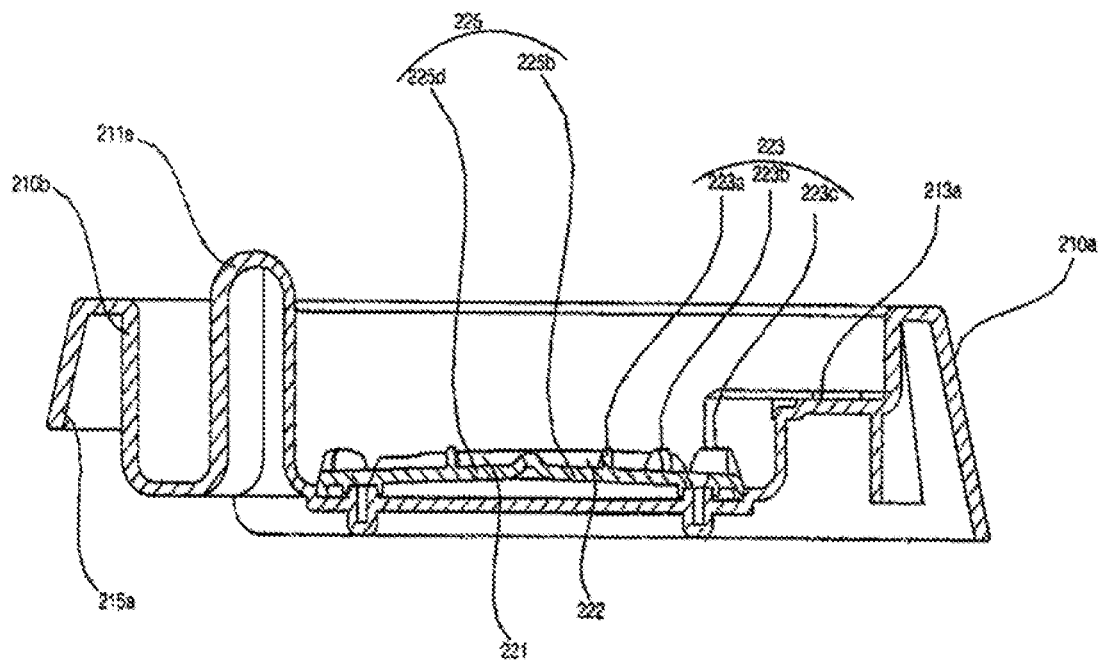
FIG. 8 is a cross-sectional view of the washing apparatus (200) of FIG. 5, taken along line B-B'.

Referring to FIGS. 6 and 8, the first left spinning mop upper surface 225a is formed to be inclined downwardly to the left front. The second left spinning mop upper surface 225b is formed to be inclined downwardly to the right front. The third left spinning mop upper surface 225c is formed to be inclined downwardly to the right rear. The fourth left spinning mop upper surface 225d is formed to be inclined downwardly to the left rear.

The first right spinning mop upper surface 235a is formed to be inclined downwardly to the left front. The second right spinning mop upper surface 235b is formed to be inclined downwardly to the right front. The third right spinning mop upper surface 235c is formed to be inclined downwardly to the right rear. The fourth right spinning mop upper surface 235d is formed to be inclined downwardly to the left rear.

The spinning mop upper surfaces 225 and 235 allow foreign substances, which are separated from a pair of the spinning mop units 120 and 130 and float in a pair of the spinning mop washing units 220 and 230, to be effectively discharged to the outside of a pair of the spinning mop washing units 220 and 230, thus improving washing performance.

The rolling mop washing unit 250 is disposed at the rear of the left spinning mop washing unit 220. The rolling mop washing unit 250 is disposed at the rear of the right spinning mop washing unit 230. The rolling mop washing unit 250 has a plurality of rolling mop protrusion lines 253a, 253b, 255a and 255b protruding upwardly and extending in the leftward and rightward directions in parallel.

The rolling mop washing unit 250 forms a rolling mop central groove 251 dented downwardly so that the lowermost point of the rolling mop unit 150 is inserted thereinto. The rolling mop central groove 251 extends in the leftward and rightward directions while traversing the center of the rolling mop washing unit 250. In this embodiment, the rolling mop central groove 251 extends in the leftward and rightward directions, but, in another embodiment, the rolling mop central groove 251 may extend in the forward and backward directions or extend in a direction between the forward and backward directions and the leftward and rightward directions so as to correspond to the extending direction of the rolling mop unit 150.

In this embodiment, the rolling mop central groove 251 is formed to be flat in the leftward and rightward directions, but is not limited thereto. The rolling mop central groove 251 may be inclined downwardly in a direction from the center to the edge thereof, thus effectively discharging foreign substances to the outside of the rolling mop washing unit.

In the rolling mop washing unit 250, front rolling mop protrusion lines 253a and 253b protruding upwardly and extending in the leftward and rightward directions in parallel are disposed in front of the rolling mop central groove 251. In the rolling mop washing unit 250, rear rolling mop protrusion lines 255a and 255b protruding upwardly and extending in the leftward and rightward directions in parallel are disposed at the rear of the rolling mop central groove 251.

As the front rolling mop protrusion lines 253a and 253b, two front rolling mop protrusion lines 253a and 253b are disposed in front of the rolling mop central groove 251. Here, the height of a first front rolling mop protrusion line 253a disposed at the front is higher than the height of a second front rolling mop protrusion line 253b disposed at the rear. The front rolling mop protrusion lines 253a and 253b have heights such that the upper ends of the front rolling mop protrusion lines 253a and 253b contact the rolling mop unit 150 when the rolling mop unit 150 is received in the rolling mop central groove 251, and thus, the rolling mop unit 150 is rotated under the condition that it contacts the upper ends of the front rolling mop protrusion lines 253a and 253b so as to separate foreign substances from the rolling mop unit 150.

As the rear rolling mop protrusion lines 255a and 255b, two rear rolling mop protrusion lines 255a and 255b are disposed at the rear of the rolling mop central groove 251. Here, the height of a second rear rolling mop protrusion line 255b disposed at the rear is higher than the height of a first rear rolling mop protrusion 255a disposed at the front. The rear rolling mop protrusion lines 255a and 255b have heights such that the upper ends of the rear rolling mop protrusion lines 255a and 255b contact the rolling mop unit 150 when the rolling mop unit 150 is received in the rolling mop central groove 251, and thus, the rolling mop unit 150 is rotated under the condition that it contacts the upper ends of the rear rolling mop protrusion lines 255a and 255b so as to separate foreign substances from the rolling mop unit 150.

A groove having a designated depth is formed between the first front rolling mop protrusion line 253a and the second front rolling mop protrusion line 253b. A groove having a designated depth is formed between the first rear rolling mop protrusion line 255a and the second rear rolling mop protrusion line 255b. The rolling mop washing unit 250 having the above-described structure discharges foreign substances removed from the rolling mop unit 150 to the outside of the rolling mop washing unit 250 through the above grooves, when the rolling mop unit 150 is rotated under the condition that it contacts the rolling mop washing unit 250, and thus, washing performance of the washing apparatus 200 may be improved.

When the rolling mop unit 150 is disposed on the rolling mop central groove 251, a space which does not contact the rolling mop unit 150 is formed between the second front rolling mop protrusion line 253b and the rolling mop central groove 251. When the rolling mop unit 150 is disposed on the rolling mop central groove 251, a space which does not contact the rolling mop unit 150 is formed between the first rear rolling mop protrusion line 255a and the rolling mop central groove 251. The rolling mop washing unit 250 having the above-described structure discharges foreign substances removed from the rolling mop unit 150 to the outside of the rolling mop washing unit 250 through the above spaces, when the rolling mop unit 150 is rotated under the condition that it contacts the rolling mop washing unit 250, and thus, washing performance of the washing apparatus 200 may be improved.

The washing apparatus 200 may further include the water supply device 260 (not shown) to supply washing water to the tray 210 and the drainage device 270 (not shown) to discharge the washing water in the tray 210 to the outside.

The water supply device 260 and the drainage device 270 may be configured to be operated manually by a user or be operated automatically as a washing process progresses.

The washing apparatus 200 may further include the detergent receipt unit (not shown) to which washing water flows through the water supply device to be mixed with a detergent.

Figure 10:
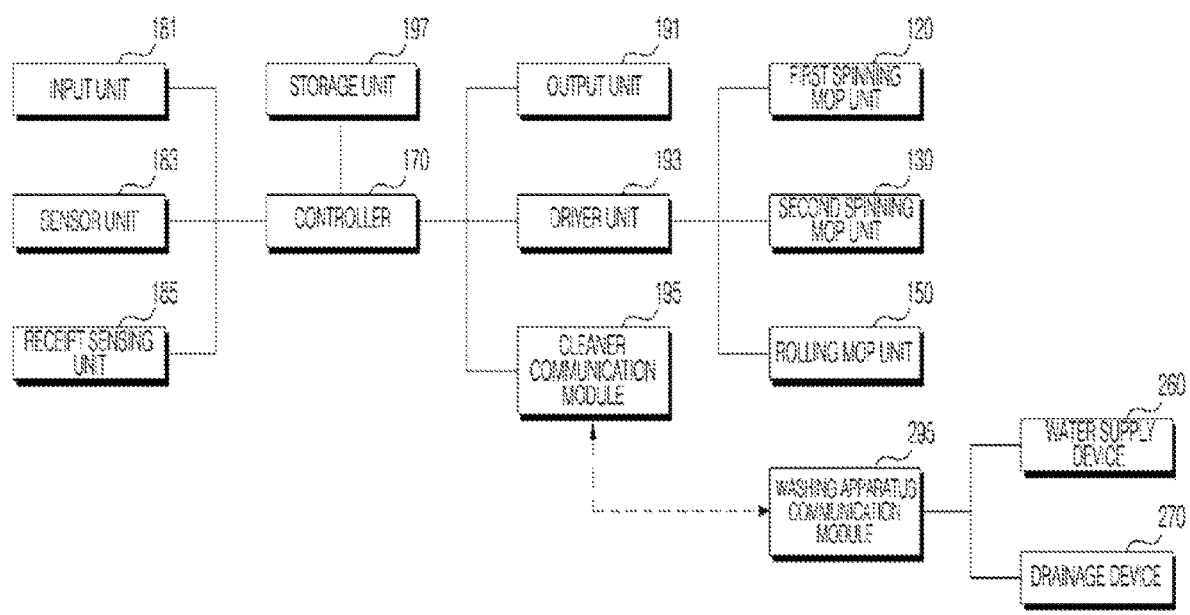
FIG. 10 is a block diagram illustrating functions of a washing control apparatus (300) in accordance with one embodiment of the present invention.

Hereinafter, a washing control apparatus configured to control the cleaner 100 and the washing apparatus 200 in accordance with one embodiment of the present invention will be described with reference to FIG. 10.

The washing control apparatus may include an input unit 181 through which a user may directly input instructions. The input unit 181 may be provided in the cleaner 100 or the washing apparatus 200, or be provided separately therefrom. In this embodiment, the input unit 181 is provided in the cleaner 100.

The input unit 181 may include switches. The switches may include a power switch to turn on/off power of the washing control apparatus. The switches may include function switches to input rotational directions, rotational speeds and rotating times of the mop units 120, 130 and 150. The washing control apparatus may be predetermined so as to give various instructions, through combinations of pressing times and/or the number of times of continuously pressing the function switches. The switches may include a reset switch to reset predetermined setting of the washing control apparatus. The switches may include a sleep switch to switch the state of the washing control apparatus to a power saving state or a non-output state.

The washing control apparatus may include a sensor unit 183 to sense the state or operation of one or more of the cleaner 100 and/or washing apparatus 200. The sensor unit 183 may be provided in the cleaner 100 or the washing apparatus 200. In this embodiment, the sensor unit 183 is provided in the cleaner 100.

The sensor unit 183 may include a sensor to sense traveling information of the cleaner 100. The traveling information includes a traveling distance. The traveling information includes a traveling time. The traveling information includes an amount of foreign substances attached to the mop units. The sensor unit 183 may include a traveling distance sensor unit (not shown) to sense a traveling distance of the cleaner 100. The sensor unit 183 may include a timer (not shown) to sense a traveling time of the cleaner 100. The sensor unit 183 may include a foreign substance sensor unit (not shown) to sense an amount of foreign substances attached to the mop units.

The amount of foreign substances attached to the mop units may be measured from a magnitude of frictional force between at least one mop unit 120, 130 or 150 and a floor surface contacting the same. In general, as the amount of foreign substances attached to the mop unit increases, frictional force with the floor surface is decreased. The magnitude of frictional force may be calculated based on rotation resistance applied to a rotation driver unit configured to rotate the at least one mop unit 120, 130 or 150. Rotation resistance applied to the rotation driver unit configured to rotate the at least one mop unit 120, 130 or 150 may be sensed, and the magnitude of frictional force may be calculated from a value pre-input based on the sensed rotation resistance.

The amount of foreign substances attached to the mop units may be measured based on a slip ratio of the at least one mop unit 120, 130 or 150. Here, the slip ratio means a ratio of slippage of a rotating object with respect to a reference surface. In general, as the amount of foreign substances attached to the mop unit increases, slippage with respect to the floor surface increases. The slip ratio may be calculated based on an actual distance to which the cleaner 100 is moved and a distance to which the cleaner 100 is expected to be moved by rotation of the at least one mop unit 120, 130 or 150. The actual distance to which the cleaner 100 is moved may be measured by installing an encoder under the cleaner 100. The magnitude of frictional force may be calculated from a value pre-input based on the slip ratio of the at least one mop unit 120, 130 or 150.

The washing control apparatus may include a receipt sensing unit 185 to sense whether or not the cleaner 100 is received in the washing apparatus 200. The receipt sensing unit 185 may be provided in the cleaner 100 or the washing apparatus 200 and, in this embodiment, the receipt sensing unit 185 is provided in the cleaner 100.

The receipt sensing unit 185 may be installed in any one of the receipt height guides 213, and thus sense whether or not the cleaner 100 is received in the washing apparatus 200. A plurality of receipt sensing units 185 may be installed in the receipt height guides 213, and thus sense whether or not the cleaner 100 is accurately received in the washing apparatus 200.

The receipt sensing unit 185 may substitute for the power switch to turn on/off power of the washing control apparatus. The washing control apparatus may be predetermined such that power of the washing control apparatus is turned on automatically when receipt of the cleaner 100 in the washing apparatus 200 is sensed.

The washing control apparatus may include the controller 170 to control at least one operation of the cleaner 100 and the washing apparatus 200. The controller 170 may control at least one operation of the cleaner 100 and the washing apparatus 200. The controller 170 may be provided in the cleaner 100 or the washing apparatus 200, or be provided separately therefrom. In this embodiment, the controller 170 is provided in the cleaner 100.

The controller 170 controls the at least one mop unit 120, 130 or 150 to be rotated under the condition that the cleaner 100 and washing water are received in the tray 210. The controller 170 controls the at least one mop unit 120, 130 or 150 to be rotated under the condition that washing water in the tray 210 is drained. The controller 170 may control the at least one mop unit 120, 130 or 150 to be rotated under the condition that the cleaner 100 and washing water are received in the tray 210, and control the at least one mop unit 120, 130 or 150 to be rotated under the condition that washing water in the tray 210 is drained.

A rotation motion of the at least one mop unit 120, 130 or 150 controlled by the controller 170 includes a rotational direction. The rotation motion of the at least one mop unit 120, 130 or 150 controlled by the controller 170 includes a rotating time. The rotation motion of the at least one mop unit 120, 130 or 150 controlled by the controller 170 includes a rotational speed.

In accordance with one embodiment of the present invention, the controller 170 may control the at least one mop unit 120, 130 or 150 to be rotated according to a value input to the input unit 181 by a user.

In accordance with another embodiment of the present invention, the controller 170 may control the at least one mop unit 120, 130 or 150 to be rotated according to a value pre-input previously by a user. The controller 170 may control the at least one mop unit 120, 130 or 150 to be rotated based on a value newly set based on values pre-input previously by the user. The controller 170 may control the at least one mop unit 120, 130 or 150 based on a value newly set as an average value of the values pre-input previously by the user.

In accordance with yet another embodiment of the present invention, the controller 170 may control the rotation motion of the at least one mop unit 120, 130 or 150 to be different according to traveling information of the cleaner 1000 under the condition that the cleaner 100 is disposed in the tray 210. The traveling information includes a traveling distance. The traveling information includes a traveling time. The traveling information includes an amount of foreign substances attached to the mop units. The traveling information may be sensed by the sensor unit 183. The sensor unit 183 may include the traveling distance sensor unit (not shown) to sense a traveling distance of the cleaner 100. The sensor unit 183 may include the timer (not shown) to sense a traveling time of the cleaner 100. The sensor unit 183 may include the foreign substance sensor unit (not shown) to sense an amount of foreign substances attached to the mop units. The traveling information may be stored in a storage unit 197.

The controller 170 may control the at least one mop unit 120, 130 or 150 so that a rotational speed of the at least one mop unit 120, 130 or 150 under the condition that the cleaner 100 and washing water are received in the tray 210 and a rotational speed of the at least one mop unit 120, 130 or 150 under the condition that washing water in the tray 210 is drained are different. The controller 170 may control the at least one mop unit 120, 130 or 150 so that a rotational speed of the at least one mop unit 120, 130 or 150 under the condition that washing water in the tray 210 is drained is higher than a rotational speed of the at least one mop unit 120, 130 or 150 under the condition that washing water is received in the tray 210. The washing control apparatus controlled in such a manner is configured that the at least one mop unit 120, 130 or 150 is individually rotated at proper speeds during a plurality of washing processes, thus improving a washing function and a spin-drying function.

The controller 170 may be provided in the cleaner 100, and a sub-controller may be additionally provided in the washing apparatus 200. The sub-controller may control at least one function of the cleaner 100 and the washing apparatus 200. The sub-controller may control at least one function of the cleaner 100 and the washing apparatus 200 in place of the controller 170. The sub-controller may receive a signal from the controller 170 and then perform a control operation.

The washing control apparatus may include an output unit 191 to inform a user of information. The output unit 191 may include a display to visually output information. The display may be a touch-sensitive display. The display may output an image. The output unit 191 may include a speaker to audibly output information.

The washing control apparatus includes driver units 193 to drive the mop units so as to rotate the mop units. As the driver units 193, a plurality of driver units 193 may be provided. The driver units 193 may be independently driven, or simultaneously driven to enable a composite motion. The driver units 193 in accordance with one embodiment of the present invention include a first spinning driver unit to rotate the left spinning mop unit 120. The driver units 193 include a second spinning driver unit to rotate the right spinning mop unit 130. The driver units 193 include a rolling driver unit to rotate the rolling mop unit 150. Hereinafter, various examples of the driver units 193 will be described.

The driver units 193 may be driven to rotate the left spinning mop unit 120 and the right spinning mop unit 130 in different directions or in the same direction. The driver units 193 may be driven to rotate the left spinning mop unit 120 under the condition that the left spinning mop unit 120 is provided to be inclined. The driver units 193 may be driven to rotate the right spinning mop unit 130 under the condition that the right spinning mop unit 130 is provided to be inclined.

The driver units 193 may rotate the left spinning mop unit 120 and the right spinning mop unit 130 in different directions. The driver units 193 may rotate the left spinning mop unit 120 and the right spinning mop unit 130 in the same direction.

The driver units 193 may be respectively driven at different speeds. The driver units 193 may drive the left spinning mop unit 120, the right spinning mop unit 130 and the rolling mop unit 150 at independent rotational speeds. The driver units 193 may drive the left spinning mop unit 120, the right spinning mop unit 130 and the rolling mop unit 150 at the same rotational speed.

The driver units 193 may be driven for different times, respectively. The driver units 193 may drive the left spinning mop unit 120, the right spinning mop unit 130 and the rolling mop unit 150 for independent rotating times. The driver units 193 may drive the left spinning mop unit 120, the right spinning mop unit 130 and the rolling mop unit 150 so that they are simultaneously rotated and stopped.

The washing control apparatus may include driving sensing units to sense current motion states by the driver units 193. The washing control apparatus may include a plurality of driving sensing units to respectively sense driving of the driver units 193. The driving sensing units may sense driving speeds. The driving sensing units may sense driving times. The driving sensing units may sense rotation resistances during driving.

The washing control apparatus may include connection terminals or communication modules 195 and 295 to electrically connect the cleaner 100 and the washing apparatus 200. In this embodiment, the washing control apparatus may include a cleaner communication module 195 provided in the cleaner 100. The washing control apparatus may include a washing apparatus communication module 295 provided in the washing apparatus 200.

The communication modules 195 and 295 may include a Wi-Fi module, a Bluetooth module, a ZigBee module, a Z-wave module, etc.

The communication modules 195 and 295 may transmit information, acquired from the input unit 181, from the cleaner 100 to the washing apparatus 200. The communication modules 195 and 295 may transmit the information, acquired from the input unit 181, from the washing apparatus 200 to the cleaner 100. The communication modules 195 and 295 may transmit information, acquired from the sensor unit 183, from the cleaner 100 to the washing apparatus 200. The communication modules 195 and 295 may transmit the information, acquired from the sensor unit 183, from the washing apparatus 200 to the cleaner 100. The communication modules 195 and 295 may transmit information, acquired from the receipt sensing unit 185, from the cleaner 100 to the washing apparatus 200. The communication modules 195 and 295 may transmit the information, acquired from the receipt sensing unit 185, from the washing apparatus 200 to the cleaner 100. The communication modules 195 and 295 may be provided to be connected to separate apparatuses in addition to the cleaner 100 and the washing apparatus 200.

The communication modules 195 and 295 may transmit information from the cleaner 100 to the washing apparatus 200. The controller 170 may control the washing apparatus 200 based on the received information. The controller 170 may control the water supply device 260 based on the received information. The controller 170 may control the drainage device 270 based on the received information.

The communication modules 195 and 295 may transmit information from the washing apparatus 200 to the cleaner 100. The controller 170 may control the cleaner 100 based on the received information. The controller 170 may control the output unit 191 based on the received information. The controller 170 may control the driver units 193 based on the received information.

The washing control apparatus may include the storage unit 197 to store input information or a control signal. The storage unit 197 may store information acquired through the input unit 181. The storage unit 197 may store information acquired through the sensor unit 183. The storage unit 197 may store information acquired through the receipt sensing unit 185. The storage unit 197 may store a control signal from the controller 170. The storage unit 197 may transmit the stored information to the controller 170.

The washing control apparatus may include the water supply device 260 to supply washing water to the washing apparatus 200. The washing control apparatus may include the drainage device 270 to drain washing water in the washing apparatus 270.

The water supply device 260 may be controlled by the controller 170. The drainage device 270 may be controlled by the controller 170. In this case, a control signal may be transmitted from the cleaner 100 to the washing apparatus 200 through the communication modules 195 and 295.

The water supply device 260 may be controlled by the sub-controller. The drainage device 270 may be controlled by the sub-controller. In this case, the sub-controller may control the water supply device 260 and the drainage device 270 based on information transmitted from the cleaner 100 to the washing apparatus 200 through the communication modules 195 and 295.

Figure 11:
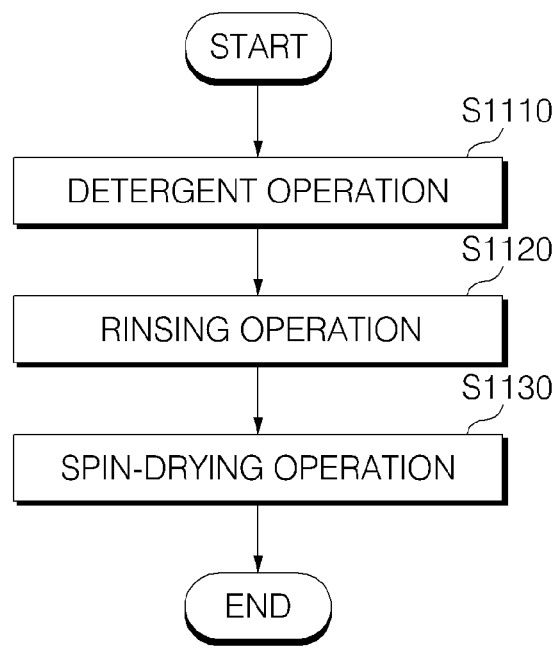
FIG. 11 is a block diagram illustrating a control method of the washing control apparatus (300) in accordance with one embodiment of the present invention.
Figure 12:
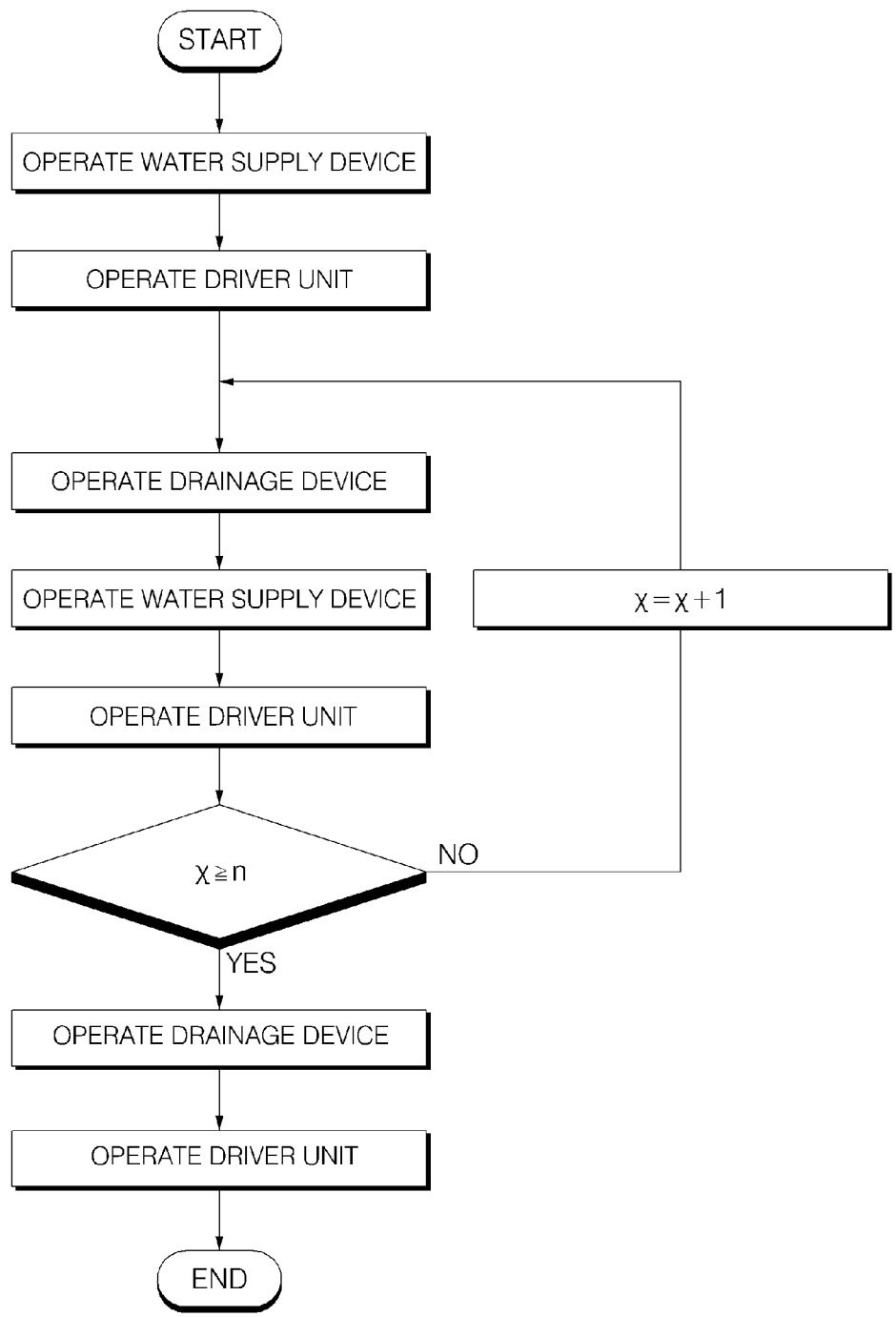
FIG. 12 is a block diagram illustrating the control method of the washing control apparatus (300) of FIG. 11 in more detail.

Hereinafter, referring to FIGS. 11 and 12, a washing control method for controlling the washing control apparatus in accordance with one embodiment of the present invention will be described.

The washing control method includes performing a washing operation S1110 and S1120 configured to rotate the at least one mop unit 120, 130 or 150 under the condition that the cleaner 100 and washing water are received in the tray 210. The washing control method includes performing a spin-drying operation S1130 configured to rotate the at least one mop unit 120, 130 or 150 under the condition that washing water in the tray 210 is drained.

In performing the washing operation S1110 and S1120 and performing the spin-drying operation S1130, a rotation motion of the at least one mop unit 120, 130 or 150 under the condition that the cleaner 100 is disposed in the tray 210 may be controlled to be different according to traveling information of the cleaner 100. The traveling information includes a traveling distance. The traveling information includes a traveling time. The traveling information includes an amount of foreign substances attached to the mop units. The traveling information may be sensed by the sensor unit 183.

In the above washing control method, the washing apparatus is controlled to be optimized according to a degree of contamination of the mop units 120, 130 and 150 of the cleaner 100, and may thus effectively wash the cleaner 100.

Performing the washing operation S1110 and S1120 and performing the spin-drying operation S1130 may be controlled so that a rotational speed of the at least one mop unit 120, 130 or 150 in performing the washing operation S1110 and S1120 and a rotational speed of the at least one mop unit 120, 130 or 150 in performing the spin-drying operation S1130 are different.

The washing control method may be controlled so that the rotational speed of the at least one mop unit 120, 130 or 150 in performing the spin-drying operation S1130 is higher than the rotational speed of the at least one mop unit 120, 130 or 150 in performing the washing operation S1110 and S1120.

In the above washing control method, the at least one mop unit 120, 130 or 150 is individually rotated at proper speeds during a plurality of washing processes, and thus a washing function and a spin-drying function may be improved.

Performing the washing operation S1110 and S1120 may include performing a detergent operation S1110 configured to to wash the cleaner 100 disposed on the washing apparatus 200. Performing the washing operation S1110 and S1120 may include performing a rinsing operation S1120 configured to rinse the cleaner 100 disposed on the washing apparatus 200.

Performing the detergent operation S1110 includes supplying washing water in which a detergent is dissolved to the washing apparatus 200.

In performing the detergent operation S1110, the washing water in which the detergent is dissolved may be supplied to the washing apparatus 200 manually by a user. In performing the detergent operation S1110, the washing water in which the detergent is dissolved may be supplied to the washing apparatus 200 automatically by the water supply device 260.

In performing the detergent operation S1110, a process of introducing the washing water into the detergent receipt unit through the water supply device 260, mixing the washing water with the detergent received in the detergent receipt unit and supplying the washing water in which the detergent is dissolved to the tray 210 may be automatically performed.

In performing the detergent operation S1110, the cleaner is disposed on the washing apparatus 200 under the condition that the cleaner 100 and the washing water in which the detergent is dissolved are received in the tray 210, and the at least one mop unit 120, 130 or 150 is rotated and washed.

In this embodiment, the at least one mop unit 120, 130 or 150 includes the left spinning mop unit 120, the right spinning mop unit 130 and the rolling mop unit 150. In performing the detergent operation S1110, at least one of rotational directions, rotational speeds and rotating times of the mop units 120, 130 and 150 may be independently controlled to have different values. In performing the detergent operation S1110, at least one of the rotational directions, the rotational speeds and the rotating times of the mop units 120, 130 and 150 may be controlled to have the same value.

Performing the rinsing operation S1120 includes draining the washing water in which the detergent is dissolved. Performing the rinsing operation S1120 includes supplying washing water in which no detergent is dissolved.

In performing the rinsing operation S1120, a process of draining the washing water in which the detergent is dissolved in the tray 210 may be performed manually by the user. In performing the rinsing operation S1120, the process of draining the washing water in which the detergent is dissolved in the tray 210 may be performed automatically by the drainage device 270.

In performing the rinsing operation S1120, a process of supplying the washing water in which no detergent is dissolved may be performed manually by the user. In performing the rinsing operation S1120, the process of supplying the washing water in which no detergent is dissolved may be performed automatically by the water supply device 260.

In performing the rinsing operation S1120, the cleaner 100 is disposed on the washing apparatus 200 under the condition that the cleaner 100 and the washing water in which no detergent is dissolved are received in the tray 210, and the at least one mop unit 120, 130 or 150 is rotated and washed.

In this embodiment, the at least one mop unit 120, 130 or 150 includes the left spinning mop unit 120, the right spinning mop unit 130 and the rolling mop unit 150. In performing the rinsing operation S1120, at least one of the rotational directions, the rotational speeds and the rotating times of the mop units 120, 130 and 150 may be independently controlled to have different values. In performing the rinsing operation S1120, at least one of the rotational directions, the rotational speeds and the rotating times of the mop units 120, 130 and 150 may be controlled to have the same value.

The washing control method may be controlled such that the rotation motion of the at least one mop unit 120, 130 or 150 in performing the detergent operation S1110 and the rotation motion of the at least one mop unit 120, 130 or 150 in performing the rinsing operation S1120 are different. The washing control method may be controlled so that the rotational speed of the at least one mop unit 120, 130 or 150 in performing the rinsing operation S1120 is higher than the rotational speed of the at least one mop unit 120, 130 or 150 in performing the detergent operation S1110. Thereby, in performing the detergent operation S1110 of the washing control method, the at least one mop unit 120, 130 or 150 is sufficiently wetted with the washing water in which the detergent is dissolved, and thus, foreign substances may be effectively separated from the at least one mop unit 120, 130 or 150. Further, in performing the rinsing operation S1120 of the washing control method, foreign substances or the detergent remaining in the at least one mop unit 120, 130 or 150 are effectively rinsed, and thus, washing performance may be improved.

Performing the spin-drying operation S1130 includes a process of draining the washing water in the tray 210. Performing the spin-drying operation S1130 includes a process of rotating the at least one mop unit 120, 130 or 150 under the condition that the cleaner 100 is received in the tray 210.

In performing the spin-drying operation S1130, the process of draining the washing water in which the detergent is dissolved in the tray 210 may be performed manually by the user. In performing the spin-drying operation S1130, the process of draining the washing water in which the detergent is dissolved in the tray 210 may be performed automatically by the drainage device 270.

In the washing control method, the rotation motion of the at least one mop unit 120, 130 or 150 in performing the washing operation S1110 and S1120 and the rotation motion of the at least one mop unit 120, 130 or 150 in performing the spin-drying operation S1130 may be controlled to be different. The washing control method may be controlled so that the rotational speed of the at least one mop unit 120, 130 or 150 in performing the spin-drying operation S1130 is higher than the rotational speed of the at least one mop unit 120, 130 or 150 in performing the washing operation S1110 and S1120.

In performing the washing operation S1110 and S1120 of the washing control method, foreign substances attached to the at least one mop unit 120, 130 or 150 are effectively separated therefrom, and thus, washing performance may be improved. Further, in performing the washing operation S1110 and S1120 of the washing control method, the foreign substances separated from the at least one mop unit 120, 130 or 150 are effectively discharged to the outside of the washing units 220, 230 and 250, and thus washing performance may be improved. In performing the spin-drying operation S1130 of the washing control method, moisture remaining in the at least one mop unit 120, 130 or 150 is effectively removed, and thus, the spin-drying function may be improved.

In the washing control method, the rotation motion of the at least one mop unit 120, 130 or 150 in performing the washing operation S1110 and S1120 may be controlled to be different from the rotation motion of the at least one mop unit 120, 130 or 150 when performing a cleaning function. In the washing control method, the rotational speed of the at least one mop unit 120, 130 or 150 in performing the washing operation S1110 and S1120 may be controlled to be higher than the rotational speed of the at least one mop unit 120, 130 or 150 when performing the cleaning function.

In the washing control method, the rotation motion of the at least one mop unit 120, 130 or 150 in performing the spin-drying operation S1130 may be controlled to be different from the rotation motion of the at least one mop unit 120, 130 or 150 when performing the cleaning function. In the washing control method, the rotational speed of the at least one mop unit 120, 130 or 150 in performing the spin-drying operation S1130 may be controlled to be higher than the rotational speed of the at least one mop unit 120, 130 or 150 when performing the cleaning function.

In the above washing control method, the at least one mop unit 120, 130 or 150 is controlled to be rotated at rotational speeds optimized to the respective processes, and thus, the cleaning function may be effectively performed when performing the cleaning function, the washing performance may be improved in performing the washing operation S1110 and S1120, and the spin-drying function may be improved in performing the spin-drying operation S1130.

In the washing control method, the water supply device 260 may be controlled to be operated as needed in performing the washing operation S1110 and S1120. In the washing control method, the drainage device 270 may be controlled to be operated as needed in performing the washing operation S1110 and S1120. In the washing control method, the water supply device 260 may be controlled to be operated as needed in performing the spin-drying operation S1130. In the washing control method, the drainage device 270 may be controlled to be operated as needed in performing the spin-drying operation S1130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A washing apparatus configured to wash a cleaner having a mop unit formed at a lower portion thereof, the washing apparatus comprising:
   a tray configured to form a space to receive the cleaner and washing water; and
   a washing unit disposed at a lower portion of an inside of the tray and configured to contact the mop unit,
   wherein the washing unit comprises:
      a first spinning mop washing unit including a first upwardly protruding portion;
      a second spinning mop washing unit including a second upwardly protruding portion; and
      a rolling mop washing unit including a plurality of upwardly protruding portions that extend in parallel to each other in leftward and rightward directions,
   wherein an upper end of the first upwardly protruding portion is inclined downwardly in a direction away from the second spinning mop washing unit, and
   wherein an upper end of the second upwardly protruding portion is inclined downwardly in a direction away from the first spinning mop washing unit.

2. The washing apparatus according to claim 1, wherein the washing unit further comprises an auxiliary upwardly protruding portion extending across the first spinning mop washing unit upwardly protruding portion.

3. The washing apparatus according to claim 2, wherein the washing unit further comprises one or more circumferential protrusions configured to extend in a circumferential direction centering on a virtual axis passing through an intersection between the first spinning mop washing unit upwardly protruding portion and the auxiliary upwardly protruding portion.

4. The washing apparatus according to claim 3, wherein the one or more circumferential protrusions comprise a plurality of protrusions respectively formed on a plurality of concentric circles centering on the virtual axis.

5. The washing apparatus according to claim 3, wherein a protruding height of the one or more circumferential protrusions is lower than heights of the first spinning mop washing unit upwardly protruding portion and the auxiliary upwardly protruding portion.

6. The washing apparatus according to claim 3, wherein ends of the one or more circumferential protrusions are spaced apart from the first spinning mop washing unit upwardly protruding portion and the auxiliary upwardly protruding portion.

7. The washing apparatus according to claim 1, wherein a lower surface of the first upwardly protruding portion of the first spinning mop washing unit is inclined downwardly in a first direction, and
wherein a lower surface of the second upwardly protruding portion of the second spinning mop washing unit is inclined downwardly in a second direction differing from the first direction.

8. The washing apparatus according to claim 1, wherein the first and second spinning mop washing units are aligned with each other in the leftward and rightward directions, and the rolling mop washing unit is disposed rearwardly of the first and second spinning mop washing units.

9. The washing apparatus according to claim 8, wherein the rolling mop washing unit includes a groove extending in the leftward and rightward directions, and
wherein the plurality of upwardly protruding portions of the rolling mop washing unit comprise:
two upwardly protruding portions disposed in front of the groove; and
two upwardly protruding portions disposed to a rear of the groove, with a height of one of the protruding portions disposed in front of the groove being higher than a height of one of the protruding portions disposed to the rear of the groove, and a height of the other of the protruding portions disposed to the rear of the groove being higher than a height of the other of the protruding portions disposed in front of the groove.

10. The washing apparatus according to claim 1, wherein a surface of the washing unit located at a position corresponding to the mop unit is inclined downwardly in a direction from a center of the washing unit to an edge of the washing unit.

11. A washing apparatus configured to wash a cleaner having at least one mop unit rotatably supported at a lower portion of the washing apparatus, the washing apparatus comprising:
a tray configured to form a space to receive the cleaner and washing water; and
a washing unit disposed at a lower portion of an inside of the tray and configured to contact the at least one mop unit,
wherein the at least one mop unit comprises:
a first spinning mop unit, wherein a lower surface of the first spinning mop unit is inclined downwardly in a first direction, and the first spinning mop unit is rotatably supported for rotation around a spinning rotation axis that is vertical or that forms an acute angle of less than 45 degrees with a vertical direction, and
a second spinning mop unit, wherein a lower surface of the second spinning mop unit is inclined downwardly in a second direction;
a rolling mop unit rotatably supported for rotation around a rolling rotation axis extending in leftward and rightward directions,
wherein the washing unit comprises at least one upwardly protruding portion extending across a moving direction of a lower surface of the at least one mop unit when the at least one mop unit is rotated,
wherein the at least one upwardly protruding portion of the washing unit comprises:
a first spinning mop upwardly protruding portion, wherein a part of the first spinning mop upwardly protruding portion is configured to contact the first spinning mop unit;
a second spinning mop upwardly protruding portion, wherein a part of the second spinning mop upwardly protruding portion is configured to contact the second spinning mop unit; and
a rolling mop washing unit including upwardly protruding portions extending in a direction parallel to the rolling rotation axis,
wherein the first spinning mop upwardly protruding portion is inclined downwardly in a direction away from the second spinning mop unit, and
wherein an upper end of the second upwardly protruding portion is inclined downwardly in a direction away from the first spinning mop unit.

12. The washing apparatus according to claim 11, wherein an inclined direction of the first spinning mop unit and an extending direction of the first spinning mop upwardly protruding portion are parallel to each other, as seen from above.

13. The washing apparatus according to claim 11,
wherein the second direction is different from the first direction, and
wherein the part of the second spinning mop upwardly protruding portion is inclined downwardly in the second direction.

* * * * *